(12) United States Patent
Sempuku et al.

(10) Patent No.: US 9,057,623 B2
(45) Date of Patent: Jun. 16, 2015

(54) NAVIGATION DEVICE

(75) Inventors: Tsuyoshi Sempuku, Tokyo (JP); Yoko Sano, Tokyo (JP); Hiroshi Shigehara, Tokyo (JP); Makoto Otsuru, Tokyo (JP); Kotoyu Sasayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 191 days.

(21) Appl. No.: 13/576,520

(22) PCT Filed: May 23, 2011

(86) PCT No.: PCT/JP2011/002862
§ 371 (c)(1),
(2), (4) Date: Aug. 1, 2012

(87) PCT Pub. No.: WO2011/148611
PCT Pub. Date: Dec. 1, 2011

(65) Prior Publication Data
US 2012/0323487 A1    Dec. 20, 2012

(30) Foreign Application Priority Data

May 24, 2010 (JP) .................................. 2010-118439

(51) Int. Cl.
*G08G 1/0969*  (2006.01)
*G01C 21/36*   (2006.01)
*G09B 29/10*   (2006.01)
*G09B 29/00*   (2006.01)

(52) U.S. Cl.
CPC ............ *G01C 21/367* (2013.01); *G08G 1/0969* (2013.01); *G09B 29/10* (2013.01); *G09B 29/007* (2013.01); *G01C 21/3676* (2013.01)

(58) Field of Classification Search
CPC ...... G01C 21/367; G09B 29/007; G09B 29/10
USPC ........................................................ 701/428
See application file for complete search history.

(56) References Cited

U.S. PATENT DOCUMENTS

| | | | |
|---|---|---|---|
| 6,144,318 A * | 11/2000 | Hayashi et al. .......... 340/995.19 |
| 2003/0036846 A1 | 2/2003 | Ikeda | |
| 2006/0220923 A1 | 10/2006 | Tanizaki et al. | |
| 2007/0172218 A1 | 7/2007 | Arie et al. | |
| 2010/0153000 A1 | 6/2010 | Akita et al. | |
| 2010/0250116 A1 | 9/2010 | Yamaguchi et al. | |

FOREIGN PATENT DOCUMENTS

| | | |
|---|---|---|
| CN | 101297177 A | 10/2008 |
| EP | 1 284 410 A2 | 2/2003 |
| EP | 1 284 410 A3 | 2/2003 |

(Continued)

*Primary Examiner* — John Q Nguyen
*Assistant Examiner* — Jordan S Fei
(74) *Attorney, Agent, or Firm* — Birch, Stewart, Kolasch & Birch, LLP

(57) ABSTRACT

A navigation device includes a road periphery display change unit 3 that selects a road R which connects to, intersects with, or is adjacent to a guidance route/a travel plan route 21 from a map database 5, and displays the road in a high contrast on the inside of a predetermined distance from the guidance route/the travel plan route 21, displays the road in a low contrast on the outside of the predetermined distance, and displays the road by changing continuously or stepwise a gradation in an intermediate region between the inside and the outside.

14 Claims, 22 Drawing Sheets

(56) References Cited

FOREIGN PATENT DOCUMENTS

| | | |
|---|---|---|
| JP | 9-229692 A | 9/1997 |
| JP | 2000-214766 A | 8/2000 |
| JP | 2000-329588 | 11/2000 |
| JP | 2004-317418 | 11/2004 |
| JP | 2005-156480 A | 6/2005 |
| JP | 2005-274908 A | 10/2005 |
| JP | 2008-081838 | 3/2008 |
| JP | 2008-157894 A | 7/2008 |
| JP | 2009-250933 | 10/2009 |
| WO | WO 2005/020186 A1 | 3/2005 |
| WO | WO 2007/049483 A1 | 5/2007 |
| WO | WO 2009/084135 A1 | 7/2009 |

* cited by examiner

2

NAVIGATION DEVICE

TECHNICAL FIELD

The present invention relates to a navigation device which displays a road which connects to, intersects with, or is adjacent to a guidance route/a travel plan route as a navigation route by changing display modes such as gradation position, gradation length and contrast.

BACKGROUND ART

Since a map display in a conventional navigation device displays uniformly all roads including unnecessary roads for route guiding, especially, in a high region in road density such as inner city, the overall screen becomes complex, which results in a factor to reduce considerably momentary visibility thereof.

As a scheme for resolving the foregoing problem, there exist a variety of conventional technologies for eliminating unnecessary information for route guiding from the screen, or for making inconspicuous such information by changing display colors. A conventional technology disclosed in Patent Document 1 displays in a toned down manner the periphery excluding a circle of a given radius around the present location. In this case, both minor streets and arterial roads are uniformly toned down. A route to a notable facility existing at a location beyond the given radius is not toned down.

PRIOR ART DOCUMENTS

Patent Documents

Patent Document 1: Japanese Patent Application Laid-Open No. 2008-157894

SUMMARY OF THE INVENTION

Problems to be Solved by the Invention

However, in the conventional technology, since the contrast of the roads which connect to, intersect with or are adjacent to the navigation route is simply lowered uniformly, the road display is blended into the background; even major arterial roads are displayed on the map in a less-visible manner, it is hard to instantaneously recognize peripheral roads during operation, and also hard to read them. For example, as shown in FIG. 40, even when an arterial road R having more lanes than a guidance route 21 currently under travel is intersected therewith, it is merely displayed lightly on the map, which may result in a display involving an impression not different from the other narrow roads R.

As a different method, as shown in FIG. 41, in a case that the contrast of a peripheral region except a circular region within a given radius from the present spot is lowered, or in a case that the contrast of the display is switched at a given distance in a normal direction to the navigation route, one road R crossing a switching region is displayed as though a road type thereof is changed across the boundary of the switching region, and it is hard to recognize the road R as a single continuous road R, which poses a problem such that instantaneous visibility thereof is deteriorated instead.

The wording "lowering contrast" discussed herein refers to a technique of making an inconspicuous display of roads by lowering saturation of road colors (approaching gray), lowering brightness thereof (darkening), or adjusting color phase thereof (approaching color of background).

An object of the present invention is to provide a navigation device which displays a road which connects to, intersects with, or is adjacent to a guidance route/a travel plan route as a navigation route by changing a display mode, and which enables instantaneous visual recognitions of where a vehicle is currently traveling on the screen and how the subsequent road condition is changed even during operation.

Means for Solving the Problems

A navigation device according to the present invention includes: a guidance route search unit for searching for a guidance route from a current location to a destination; and a road periphery display change unit for displaying a road which connects to, intersects with, or is adjacent to the guidance route in a high contrast on the inside of a first distance from the guidance route, displaying the road in a low contrast on the outside of a second distance that is longer than the first distance, and displaying the road by changing continuously or stepwise a gradation in an intermediate region between the inside and the outside, wherein a range of changing the gradation is expanded or contracted according to a degree of importance of the road.

Effect of the Invention

According to the navigation device of the invention, the road which connects to, intersects with, or is adjacent to the guidance route is displayed in a high contrast on the inside of a first distance from the guidance route, displayed in a low contrast on the outside of a second distance that is longer than the first distance, and displayed by changing continuously or stepwise a gradation in an intermediate region between the inside and the outside, and thereby a strip-shaped part of a given region around the guidance route is displayed to stand out from the periphery.

As a result, the unnecessary peripheral parts are displayed in a low contrast, not drawing an attention more than necessary; thus, the line of sight is naturally fixed to the strip-shaped portion around the guidance route displayed in a high contrast, which enables to instantaneously visually recognize where a vehicle is traveling on the screen and how the subsequent road condition is changed even in operation.

BEST MODE FOR CARRYING OUT THE INVENTION

In the following, embodiments of the present invention will be described in detail with reference to the accompanying drawings.

Embodiment 1

Figure 1:
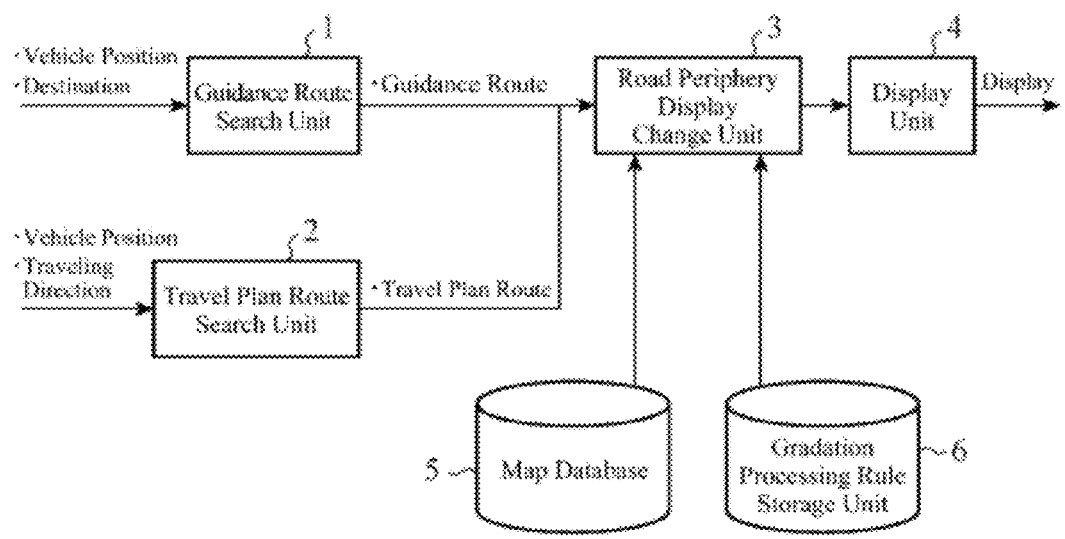
FIG. 1 is a block diagram showing a configuration of main parts of a navigation device according to Embodiment 1.

Embodiment 1 is a case of performing processing of gradually lowering the contrast of roads R which connect to, intersect with, or are adjacent to a guidance route/a travel plan route 21, as the distance from the guidance route/the travel plan route 21 increases. FIG. 1 is a block diagram showing a configuration of main parts of a navigation device according to Embodiment 1, and includes a guidance route search unit 1, a travel plan route search unit 2, a road periphery display change unit 3, a display unit 4, a map database 5, and a gradation processing rule storage unit 6.

The guidance route search unit 1 is provided for searching for a guidance route 21 from a current location (place of departure) to a destination; this is the same as a route search that has been carried out from the past. The travel plan route search unit 2 searches for the travel plan route 21 assuming that a road currently under travel is traveled subsequently along the road without searching for the guidance route.

The road periphery display change unit 3 receives the guidance route/the travel plan route 21 to be searched as mentioned above, map information from the map database 5, and a gradation processing rule from the gradation processing rule storage unit 6, and then changes display modes such as gradation position, gradation length, and contrast.

Figure 2:
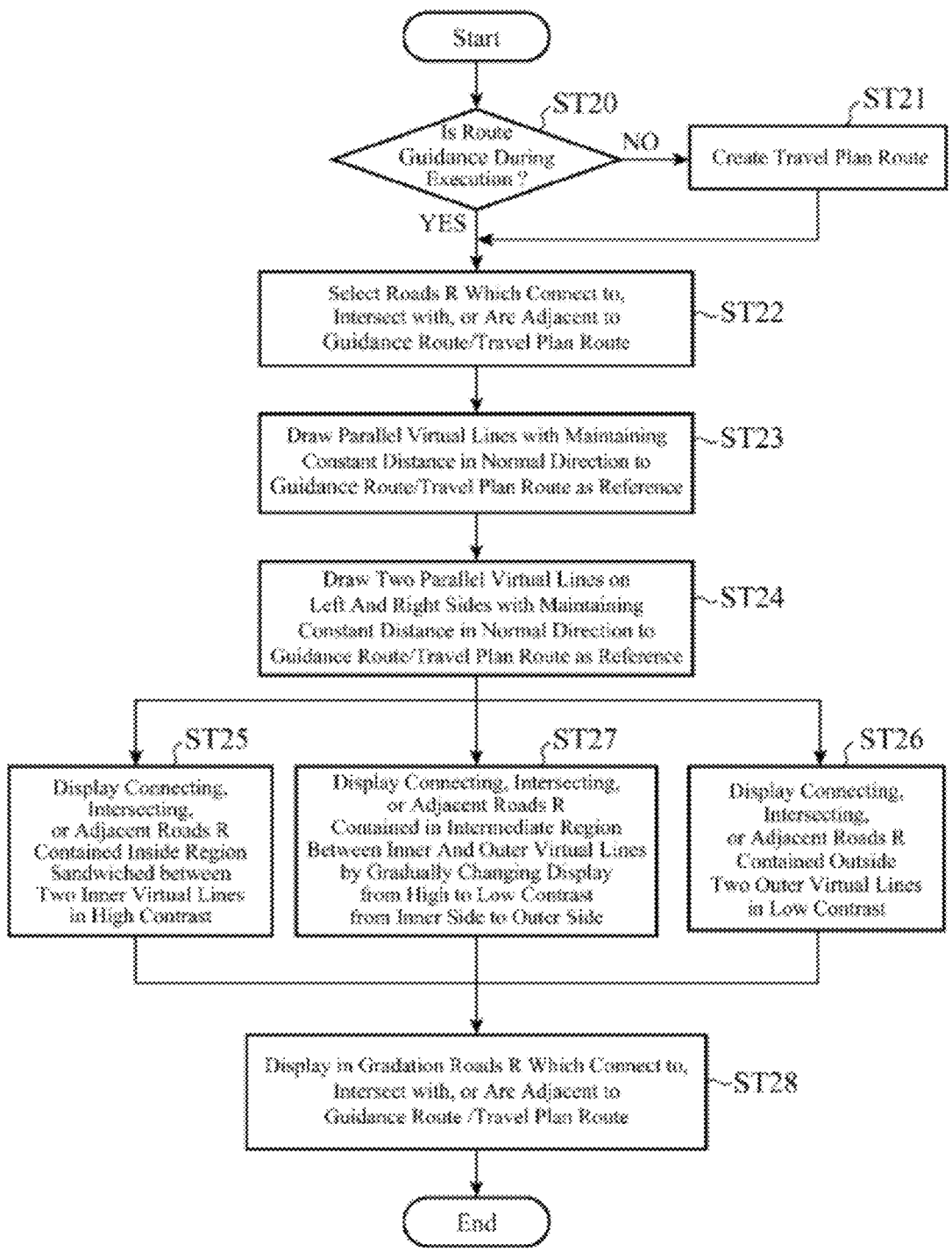
FIG. 2 is a flowchart explaining an operation of Embodiment 1.

Hereinafter, an operation of Embodiment 1 will be explained with reference to a flowchart shown in FIG. 2. First, it is determined whether a route guidance is during execution in the guidance route search unit 1 (step ST20); if the determination is NO, the travel plan route search unit 2 creates a travel plan route (step ST21). Subsequently, when the determination in step ST20 is YES and when the creation of the travel plan route in step ST21 is complete, the road periphery display change unit 3 performs processing operations of step ST21 to step ST27.

Figure 3:
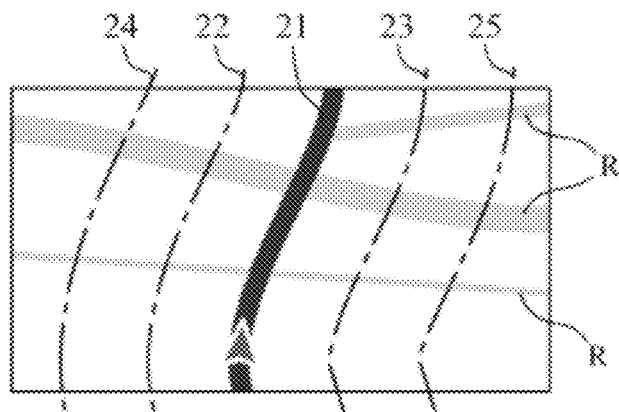
FIG. 3 is a process chart of a display based on the operation of Embodiment 1.

The road periphery display change unit 3 receives map information from the map database 5, and selects roads R which connect to, intersect with, or are adjacent to the guidance route/the travel plan route 21 (step ST22). Then, parallel virtual lines are drawn with maintaining a predetermined constant distance in a normal direction to the left and right of the guidance route/the travel plan route 21 as a reference (step ST23). Two of the virtual lines are respectively drawn on the left and right of the guidance route/the travel plan route 21 as the reference (step ST24). In this manner, as shown in FIG. 3, parallel virtual lines 22 to 25 are drawn with maintaining a constant distance in a normal direction to the left and right of the guidance route/the travel plan route 21 as the reference. Hereupon, a distance between the guidance route/the travel plan route 21 and the virtual lines 22, 23 corresponds to a first distance, and a distance between the guidance route/the travel plan route 21 and the virtual lines 24, 25 corresponds to a second distance.

Figure 4:
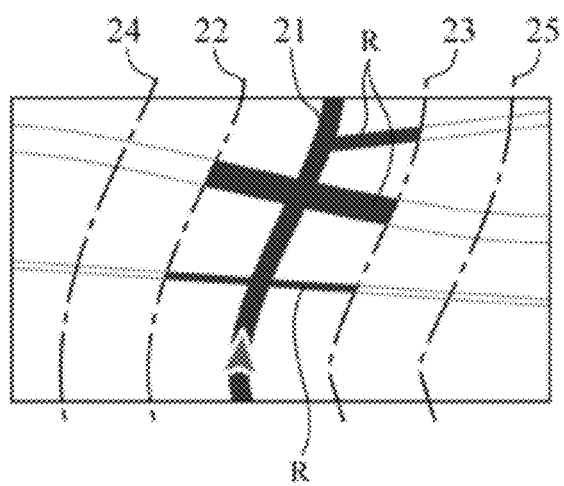
FIG. 4 is a process chart of the display based on the operation of Embodiment 1.
Figure 5:
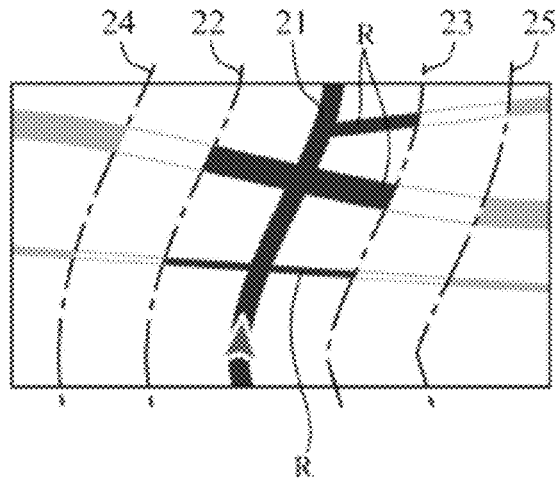
FIG. 5 is a process chart of the display based on the operation of Embodiment 1.

Subsequently, the road periphery display change unit 3 reads a gradation processing rule stored in the gradation processing rule storage unit 6 and, as shown in FIG. 4, displays connecting, intersecting, or adjacent roads R which are contained inside a region sandwiched between the two inner virtual lines 22, 23 in a high contrast and at a normal concentration as shown in FIG. 4 (step ST25). Moreover, the connecting, intersecting, or adjacent roads R which are contained outside the outer virtual lines 24, 25 are displayed in a low contrast as shown in FIG. 5 to provide a visually inconspicuous expression thereof (step ST26).

Figure 6:
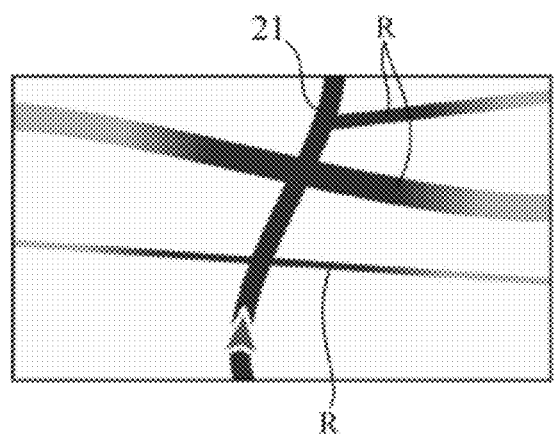
FIG. 6 is a process chart of the display based on the operation of Embodiment 1.

Then, the connecting, intersecting, or adjacent roads R contained in an intermediate region between the inner virtual lines 22, 23 and the outer virtual lines 24, 25 are displayed in a gradation by gradually changing the display continuously or in multiple stages from high to low contrast from the inside toward the outside as shown in FIG. 6 (step ST27). In this case, though the gradation processing is preferably achieved by a continuous change such that a gradation difference thereof is as inconspicuous as possible, it may be performed in multiple stages of approximately 5 to 10 stages in order to increase a drawing processing speed.

Subsequently, the display unit 4 receives a display signal from the road periphery display change unit 3 processed as mentioned above, and displays in a gradation the roads R which connect to, intersect with, or are adjacent to the guidance route/the travel plan route 21 (step ST28).

As described above, according to Embodiment 1, the roads R which connect to, intersect with, or are adjacent to the guidance route/the travel plan route are displayed in a high contrast on the inside of a predetermined distance from the guidance route/the travel plan route, displayed in a low contrast on the outside of the predetermined distance, and displayed by continuously or stepwise changing in a gradation an intermediate region between the inside and the outside, and thereby a strip-shaped part within a given range around the guidance route/the travel plan route is displayed to stand out from the periphery. As a result, the peripheral unnecessary portions are displayed in a low contrast, not drawing an attention more than necessary; thus, the line of sight is naturally fixed to the strip-shaped portion around the guidance route/the travel plan route displayed in a high contrast, which enables to instantaneously visually recognize where a vehicle is traveling on the screen and how the subsequent road condition is changed even during operation.

Embodiment 2

Figure 7:
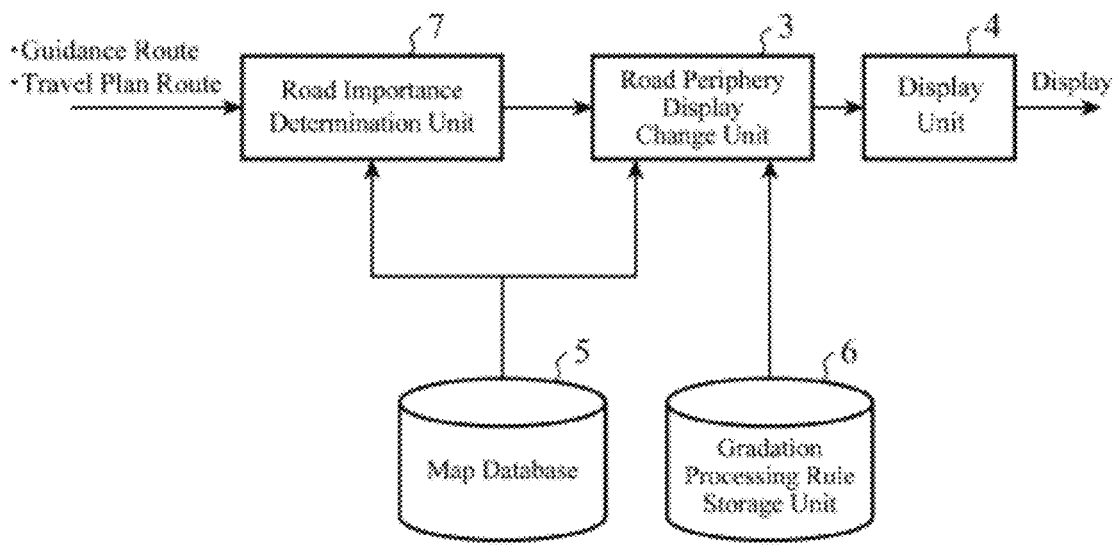
FIG. 7 is a block diagram showing a configuration of main parts of a navigation device according to Embodiment 2.

Embodiment 2 is a case of changing a length of gradation change according to a degree of importance (road type, the number of lanes, road width) of connecting, intersecting or adjacent roads R. FIG. 7 is a block diagram showing a configuration of main parts of a navigation device according to Embodiment 2, and a road importance determination unit 7 is provided on the receiving side of a road periphery display change unit 3. Since the remaining components are the same as those of Embodiment 1, the same reference numerals are denoted to the same parts, and redundant explanations thereof will be omitted. Note that an illustration of a guidance route search unit 1 and a travel plan route search unit 2 is omitted in FIG. 7.

Figure 8:
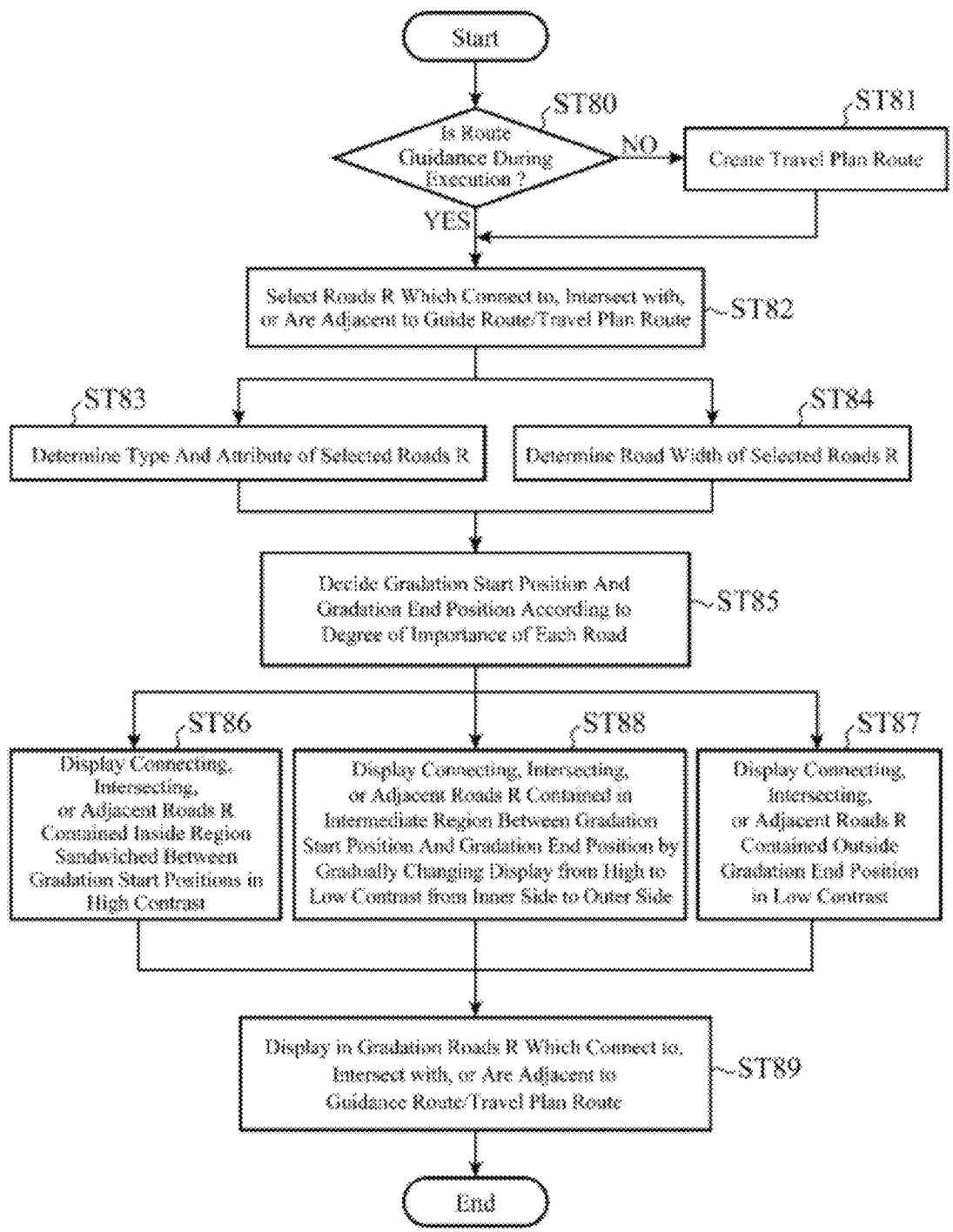
FIG. 8 is a flowchart explaining an operation of Embodiment 2.

Hereinafter, an operation of Embodiment 2 will be explained with reference to a flowchart shown in FIG. 8. First, it is determined whether a route guidance is during execution in the guidance route search unit 1 (step ST80); if the determination is NO, the travel plan route search unit 2 creates a travel plan route (step ST81). Subsequently, when the determination in step ST80 is YES and when the creation of the travel plan route in step ST81 is complete, the road periphery display change unit 3 performs processing operations of step ST82 to step ST88.

The road periphery display change unit 3 receives map information from a map database 5, and selects roads R which connect to, intersect with, or are adjacent to a guidance route/a travel plan route 21 (step ST82). Then, the type and attribute (expressway, public road, national road, prefectural road, minor street, and so on) of the selected roads are determined (step ST83).

Figure 9:
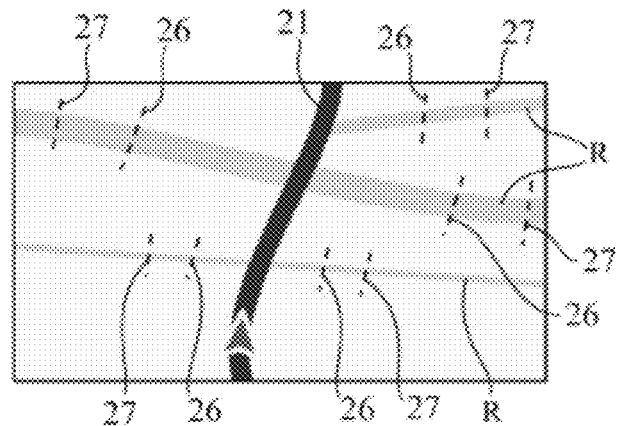
FIG. 9 is a process chart of a display based on the operation of Embodiment 2.

Moreover, the road width of the selected roads R is determined (step ST84). The actual road width for each road R is calculated by referring to the information regarding the number of lanes for each road R stored in the map database 5 and/or the most detailed map database. It is thereby possible to perform an easy-to-understand map drawing that is even closer to an actual road condition. Subsequently, a gradation start position 26 and a gradation end position 27 are decided as shown in FIG. 9 according to the degree of importance of each of the selected roads R (step ST85). Hereupon, a distance between the guidance route/the travel plan route 21 and the gradation start position 26 corresponds to a first distance, and a distance between the guidance route/the travel plan route 21 and the gradation end position 27 corresponds to a second distance.

Figure 10:
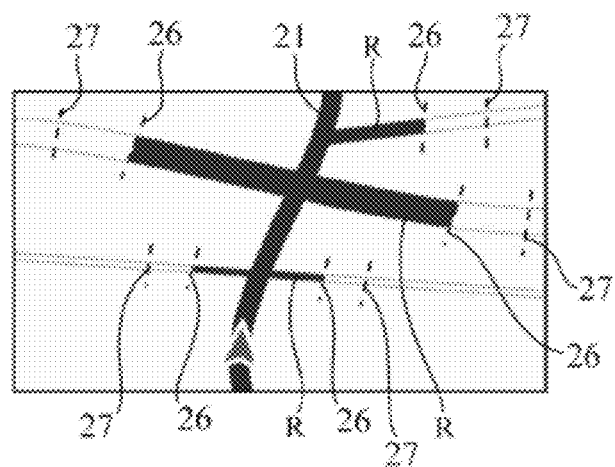
FIG. 10 is a process chart of the display based on the operation of Embodiment 2.
Figure 11:
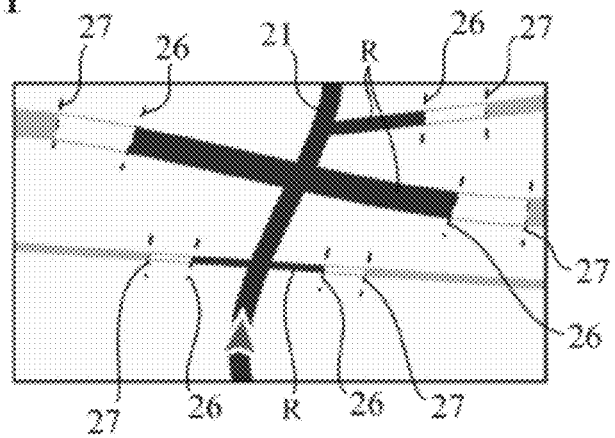
FIG. 11 is a process chart of the display based on the operation of Embodiment 2.

Then, the connecting, interesting, and adjacent roads R contained inside the region sandwiched between the left and right gradation start positions 26 with the guidance route/the travel plan route 21 as a reference are displayed in a high contrast as shown in FIG. 10 (step ST86). Moreover, the connecting, intersecting or adjacent roads R contained outside the gradation end position 27 are displayed in a low contrast as shown in FIG. 11 (step ST87).

Figure 12:
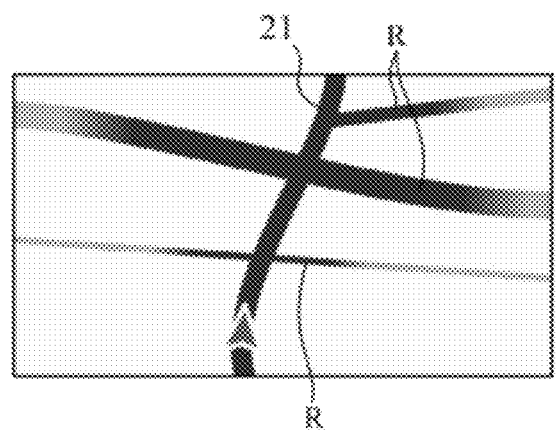
FIG. 12 is a process chart of the display based on the operation of Embodiment 2.

Further, the connecting, intersecting, or adjacent roads R contained in an intermediate region between the gradation start position 26 and the end position 27 are displayed in a gradation by gradually changing the display continuously or in multiple stages from high to low contrast from the inside toward the outside as shown in FIG. 12 (step ST88). Then, among the classified roads R, the length of gradation change is set to be longer for the roads having a higher degree of importance, having more lanes, and having a wider width. Moreover, it is contemplated that the roads having a higher degree of importance, having more lanes, and having a wider road are displayed clearly on the screen even though the distance from the guidance route increases. The roads having a lower degree of importance is subjected to gradation processing by a shorter distance and blended into a base color to be made inconspicuous. In this case, though the gradation processing is preferably achieved by a continuous change such that a gradation difference thereof is as inconspicuous as possible, it may be performed in multiple stages of approximately 5 to 10 stages in order to increase a drawing processing speed.

The display unit 4 receives a display signal from the road periphery display change unit 3 that is processed as mentioned above, and displays in a gradation the roads R which connect to, intersect with, or are adjacent to the guidance route/the travel plan route 21 (step ST89).

As described above, according to Embodiment 2, in the case that the range of gradation change according to the road type and the road width (number of lanes) is changed as the roads intersecting with the route are more major and more important, the roads are displayed longer and more intense; thus, it is possible to analogize more intuitively the size of the roads R such that "the longer roads are major roads, and the shorter roads are minor streets," which facilitates the understanding of the road information of the periphery. The effects of causing the major roads to be more conspicuous and increasing the instantaneous visibility are expected.

Figure 27:
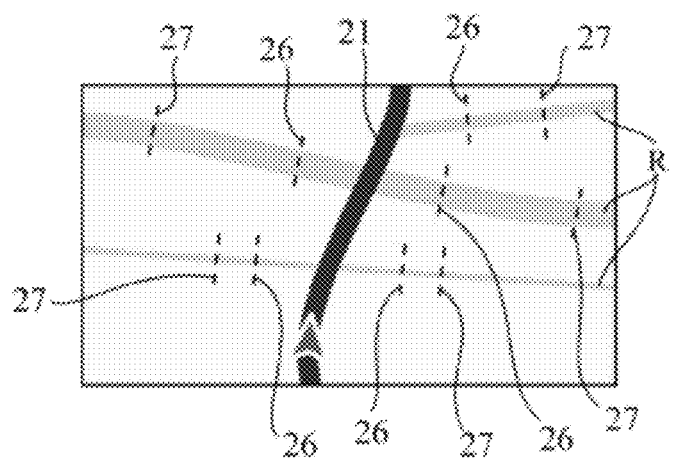
FIG. 27 is a process chart of another display based on the operation of Embodiment 2.
Figure 28:
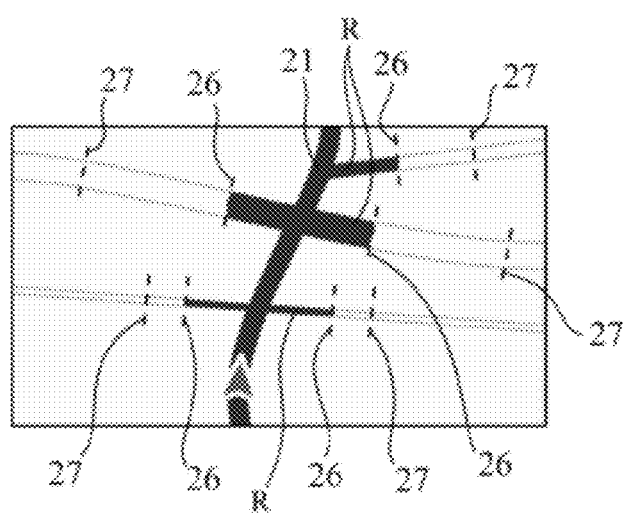
FIG. 28 is a process chart of another display based on the operation of Embodiment 2.
Figure 29:
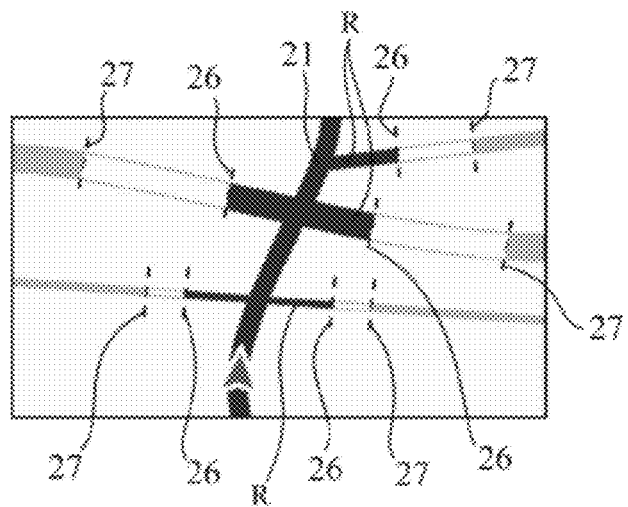
FIG. 29 is a process chart of another display based on the operation of Embodiment 2.
Figure 30:
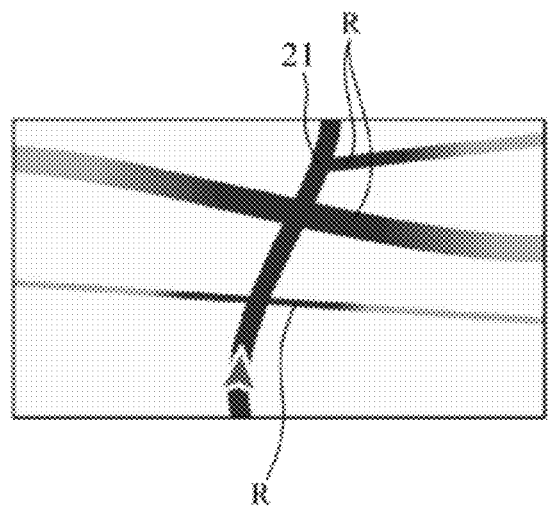
FIG. 30 is a process chart of another display based on the operation of Embodiment 2.

Note that as a method of expanding and contracting the range of gradation change, an example where both the gradation start position and the gradation end position are changed is explained; however, only one of the positions may be changed. For example, as shown in FIG. 27, the gradation start positions 26 of the roads R having a high degree of importance are moved in a direction which approaches the guidance route/the travel plan route 21 in comparison to the case of FIG. 9; the roads R sandwiched between the left and right gradation start positions 26 are displayed in a high contrast as shown in FIG. 28; and the roads R contained outside the gradation end position 27 are displayed in a low contrast as shown in FIG. 29; thus, the range of gradation change can be elongated as shown in FIG. 30.

Embodiment 3

Figure 13:
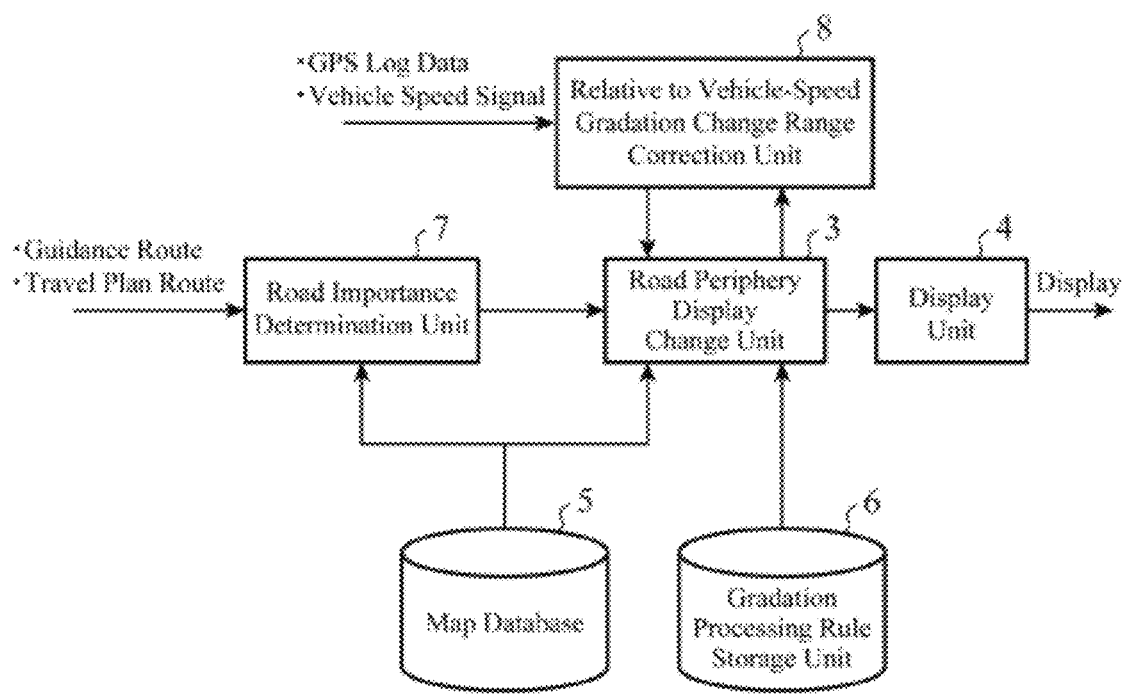
FIG. 13 is a block diagram showing a configuration of main parts of a navigation device according to Embodiment 3.

Embodiment 3 is a case of changing a range of gradation change of connecting roads according to a travel speed. FIG. 13 is a block diagram showing a configuration of main parts of a navigation device according to Embodiment 3, and a road importance determination unit 7 is provided on the receiving side of a road periphery display change unit 3, and a relative to vehicle-speed gradation change range correction unit 8 that receives GPS log data and vehicle speed signals is provided and connected to the road importance determination unit 7. Since the remaining components are the same as those of Embodiment 1, the same reference numerals are denoted to the same parts, and redundant explanations thereof will be omitted. Note that an illustration of a guidance route search unit 1 and a travel plan route search unit 2 is omitted in FIG. 13.

Figure 14:
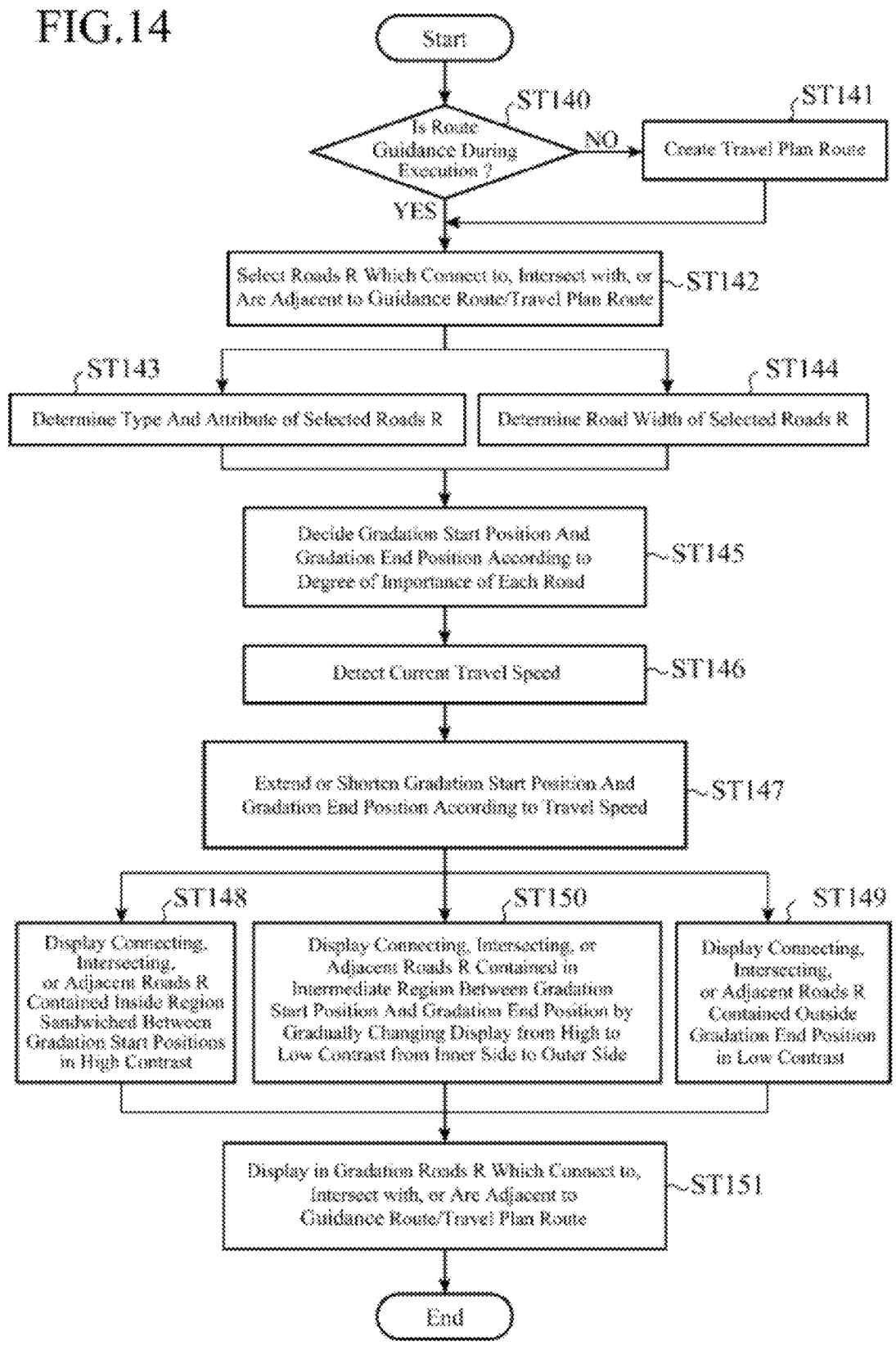
FIG. 14 is a flowchart explaining an operation of Embodiment 3.

Hereinafter, an operation of Embodiment 3 is now explained with reference to a flowchart shown in FIG. 14. First, it is determined whether a route guidance is during execution in the guidance route search unit 1 (step ST140); if the determination is NO, the travel plan route search unit 2 creates a travel plan route (step ST141). Subsequently, when the determination in step ST140 is YES and when the creation of the travel plan route in step ST141 is complete, the road periphery display change unit 3 performs processing operations of step ST142 to step ST150.

The road periphery display change unit 3 receives map information from a map database 5, and selects roads R which connect to, intersect with, or are adjacent to a guidance route/a travel plan route 21 (step ST142). Then, the type and attribute (expressway, public road, national road, prefectural road, minor street, and so on) of the selected roads R are determined (step ST143).

Moreover, the road width of the selected roads R is determined (step ST144). The actual road width for each road R is calculated by referring to the information regarding the number of lanes for each road R stored in the map database 5 and/or the most detailed map database. It is thereby possible to perform an easy-to-understand map drawing that is even closer to an actual road condition.

Figure 15:
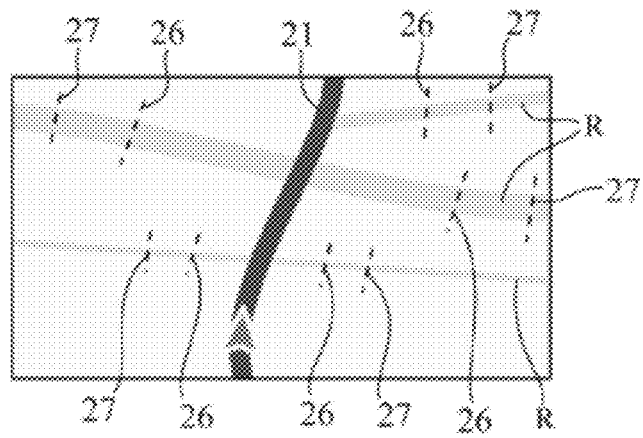
FIG. 15 is a process chart of a display based on the operation of Embodiment 3.
Figure 16:
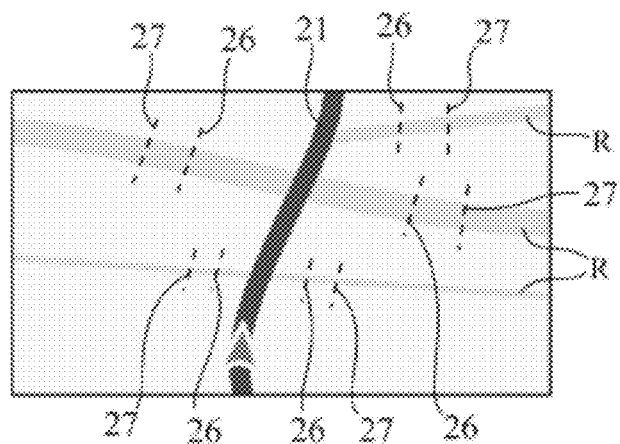
FIG. 16 is a process chart of the display based on the operation of Embodiment 3.

Then, a gradation start position 26 and a gradation end position 27 are decided as shown in FIG. 15 according to a degree of importance of each of the selected roads R (step ST145). Subsequently, the relative to vehicle-speed gradation change range correction unit 8 detects a current travel speed from the GPS log data and the vehicle speed signal (step ST146), and shortens or extends a distance between the gradation start position 26 and the gradation end position 27 according to the detected travel speed (step ST147). In FIG. 16, the distance between the gradation start position 26 and the gradation end position 27 is shortened by causing the gradation start position 26 to approach the guidance route/the travel plan route 21 and also the gradation end position 27.

Then, the connecting, interesting, and adjacent roads R contained inside the region sandwiched between the left and right gradation start positions 26 with the guidance route/the travel plan route 21 as a reference are displayed in a high contrast as shown in FIG. 10 (step ST148). Moreover, the connecting, intersecting or adjacent roads R contained outside the gradation end position 27 are displayed in a low contrast as shown in FIG. 11 (step ST149).

Further, the connecting, intersecting, or adjacent roads R contained in an intermediate region between the gradation start position 26 and the end position 27 are displayed in a gradation by gradually changing the display continuously or in multiple stages from high to low contrast from the inside toward the outside as shown in FIG. 12 (step ST150).

The display unit 4 receives a display signal from the road periphery display change unit 3 processed as mentioned above, and displays in a gradation the roads R which connect to, intersect with, or are adjacent to the guidance route/the travel plan route 21 (step ST151).

Figure 17:
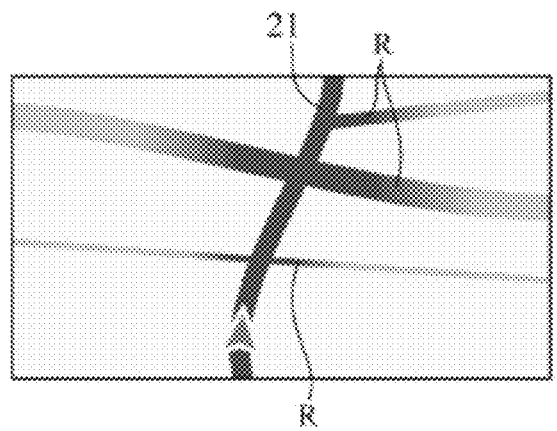
FIG. 17 is a process chart of the display based on the operation of Embodiment 3.

In other words, as the travel speed increases, the range of gradation change of the connecting, intersecting or adjacent roads R is shortened as shown in FIG. 16. For example, the connecting, intersecting or adjacent roads R are displayed such that a range of gradation change for each road size is defined with 40 kilometers per hour as a reference. When the speed is increased by 10%, the length of gradation change of the connecting, intersecting or adjacent roads R contained in an intermediate region between the gradation start position 26 and the gradation end position 27 is defined to be shorter by 10% as shown in FIG. 17.

Figure 18:
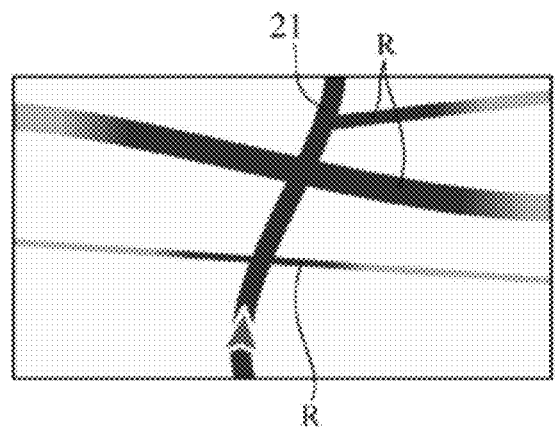
FIG. 18 is a process chart of the display based on the operation of Embodiment 3.

Contrarily, when the speed is decreased by 10%, the length of gradation change is defined to be longer by 10%. In other words, as the speed is slower, the length of gradation change of the connecting, intersecting or adjacent roads R contained in the intermediate region between the gradation start position 26 and the gradation end position 27 is extended as shown in FIG. 18, and the detailed information of the surroundings is displayed in an easy-to-view manner. When the vehicle is in a stop state due to waiting for a traffic light, traffic jam, and so on, all the roads extending to the periphery of the screen may be displayed in a high contrast without performing any gradation change.

As mentioned above, since it is necessary to instantaneously read the screen information as the speed increases, a screen display having a high safety can be provided by shortening the range of gradation change in order to reduce the amount of information of the periphery. Moreover, since the range of gradation change is gradually changed according to the speed, it becomes possible to present the optimal amount of information according to the travel speed at the very moment without a feeling of discomfort such that the screen display is suddenly switched.

As described above, according to Embodiment 3, in the case that the range of gradation change corresponding to the speed of the traveling vehicle is changed, the peripheral narrow roads are also displayed in a longer gradation width when the vehicle speed is slow, and it is thereby possible to recognize more easily the conditions of the peripheral narrow roads. Contrarily, when the vehicle speed is fast, the range of gradation change of the secondary roads is narrowed, so that only the guidance route is made conspicuous to thus enhance instantaneous visibility thereof, which contributes to safe driving by shortening a gaze duration. On the contrary, in a traffic jam, as the speed of the vehicle decreases, the peripheral condition is displayed in an easy-to-view manner in order to make an easy search for a shortcut and so on.

Embodiment 4

Figure 19:
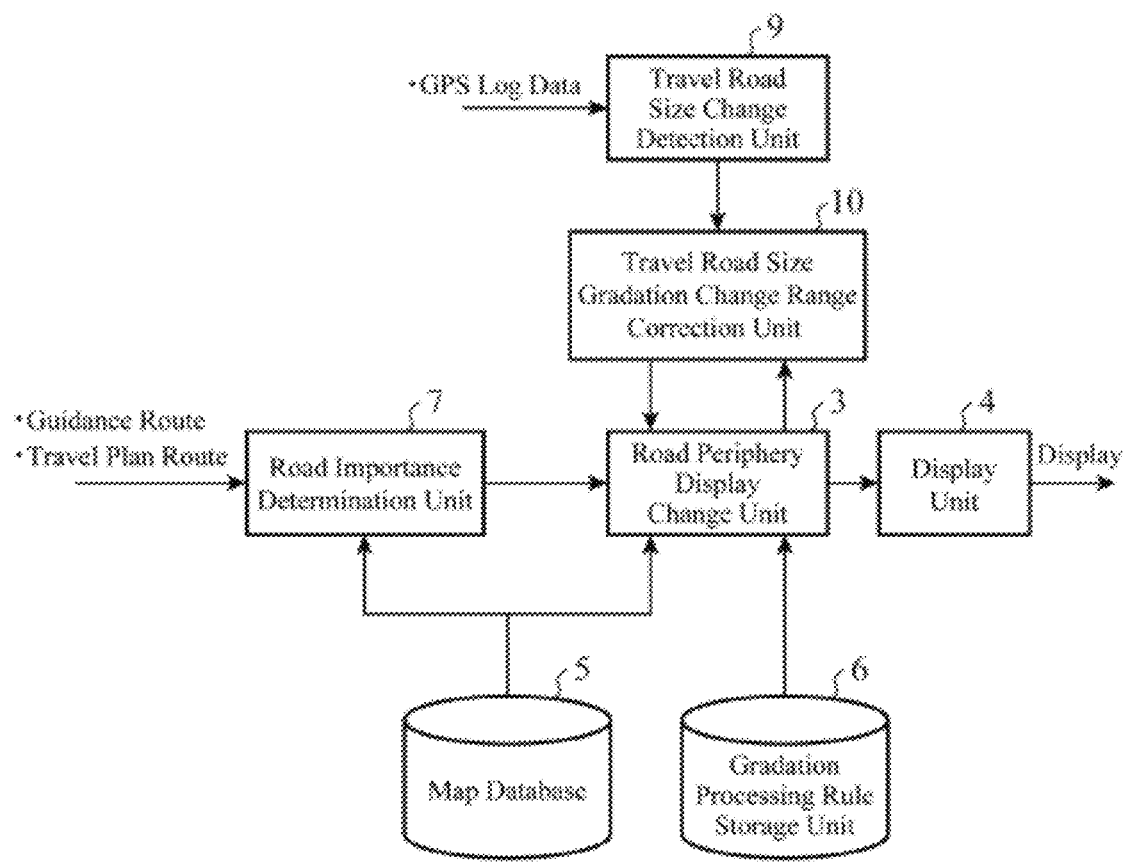
FIG. 19 is a block diagram showing a configuration of main parts of a navigation device according to Embodiment 4.

Embodiment 4 is a case of changing a length of gradation change of a connecting road according to the size (road type, the number of lanes, road width) of a road currently under travel. FIG. 19 is a block diagram showing a configuration of main parts of a navigation device according to Embodiment 4, and a travel road size change detection unit 9 and a travel road size gradation change range correction unit 10 that receives GPS log data are provided therein. Since the remaining components are the same as those of Embodiment 2, the same reference numerals are denoted to the same parts, and redundant explanations thereof will be omitted. Note that an illustration of a guidance route search unit 1 and a travel plan route search unit 2 is omitted in FIG. 19.

Figure 20:
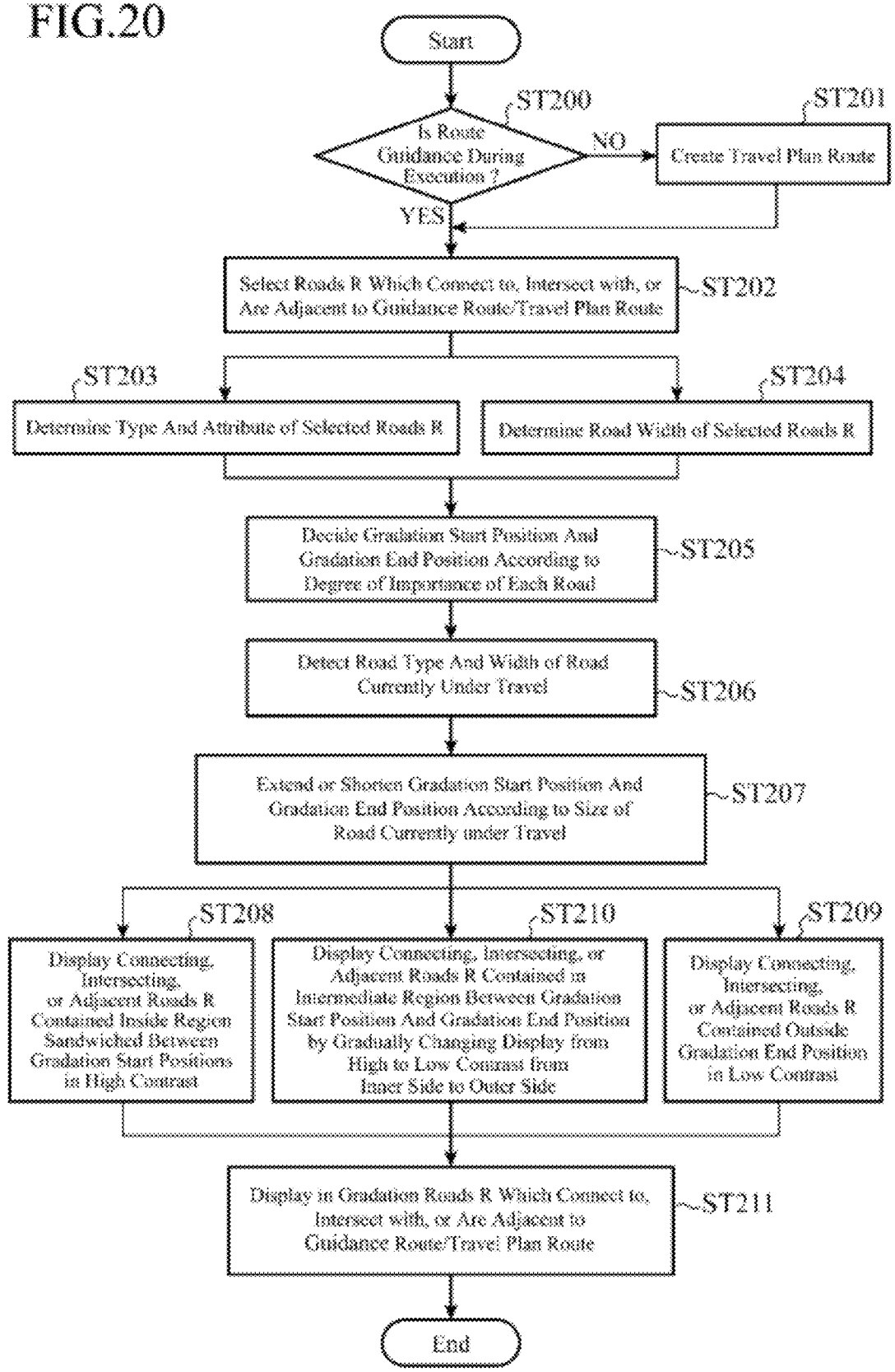
FIG. 20 is a flowchart explaining an operation of Embodiment 4.

Hereinafter, an operation of Embodiment 4 will be explained with reference to a flowchart shown in FIG. 20. First, it is determined whether a route guidance is during execution in the guidance route search unit 1 (step ST200); if the determination is NO, the travel plan route search unit 2 creates a travel plan route (step ST201). Subsequently, when the determination in step ST200 is YES and when the creation of the travel plan route in step ST201 is complete, a road periphery display change unit 3 performs processing operations of step ST202 to step ST210.

The road periphery display change unit 3 receives map information from the map database 5, and selects roads R which connect to, intersect with, or are adjacent to the guidance route/the travel plan route 21 (step ST202). Then, the type and attribute (expressway, public road, national road, prefectural road, minor street, and so on) of the selected roads R are determined (step ST203).

Moreover, the road width of the selected roads R is determined (step ST204). The actual road width for each road R is calculated by referring to the information regarding the number of lanes for each road R stored in the map database 5 and/or the most detailed map database. It is thereby possible to perform an easy-to-understand map drawing that is even closer to an actual road condition. Then, a gradation start position 26 and a gradation end position 27 are decided according to a degree of importance of each of the selected roads R (step ST205).

Subsequently, the travel road size change detection unit 9 detects the type and the width of the road currently under travel based on the GPS log data (step ST206), and the travel road size gradation change range correction unit 10 that receives the detection signal extends or shortens the distance between the gradation start position 26 and the gradation end position 27 of the roads R which connect to, intersect with, or are adjacent to the guidance route/the travel plan route 21 according to the size (road type, the number of lanes, road width) of the road currently under travel (step ST207).

Then, the connecting, interesting, and adjacent roads R contained inside the region sandwiched between the left and right gradation start positions 26 with the guidance route/the travel plan route 21 as a reference are displayed in a high contrast as shown in FIG. 10 (step ST208). Moreover, the connecting, intersecting or adjacent roads R contained outside the gradation end position 27 are displayed in a low contrast as shown in FIG. 11 (step ST209).

Further, the connecting, intersecting, or adjacent roads R contained in an intermediate region between the gradation start position 26 and the end position 27 are displayed in a gradation by gradually changing the display continuously or in multiple stages from high to low contrast from the inside toward the outside as shown in FIG. 17 or FIG. 18 (step ST210).

The display unit 4 receives a display signal from the road periphery display change unit 3 processed as mentioned above, and displays in a gradation the roads R which connect to, intersect with, or are adjacent to the guidance route/the travel plan route 21 (step ST211).

For example, the display is changed as follows according to the detected size (road type, the number of lanes, road width) of the road currently under travel.

Case where the road R currently under travel is determined to be an expressway:

Only the roads R which connect to the on-ramp and off-ramp of the expressway on the advance direction side on the screen are detected, and processed to have a longish length of gradation change. The remaining roads R are displayed in a given low contrast.

Case where the road R currently under travel is determined to be a major arterial road:

The roads R that are the same as or greater than the guidance route/the travel plan route 21 in size, and which connect to, intersect with, or are adjacent to the guidance route/the travel plan route 21 are processed to have a longish gradation width, and the roads R that are smaller in size than the road R currently under travel are processed by a short gradation to be made inconspicuous.

Case where the road R currently under travel is determined to be a minor street:

The part near the current location is set to have an expanded length of gradation change so that the details of the peripheral road condition can be viewed easily. The length of gradation change is shortened as the distance from the current location increases.

However, the major arterial road, expressway and the like are processed to have a longer length of gradation change, or displayed in a given high contrast without undergoing the gradation processing.

As described above, according to Embodiment 4, in the case that the range of gradation change is changed based on the size of the road R currently under travel, during traveling on an arterial road having a large size, the road R that is equal to or greater than the arterial road in size are made conspicuous, while during traveling on a narrow road R, other similar roads R are also maintained to have a longish range of gradation change, thereby facilitating the understanding of the peripheral road connecting condition.

Embodiment 5

Figure 21:
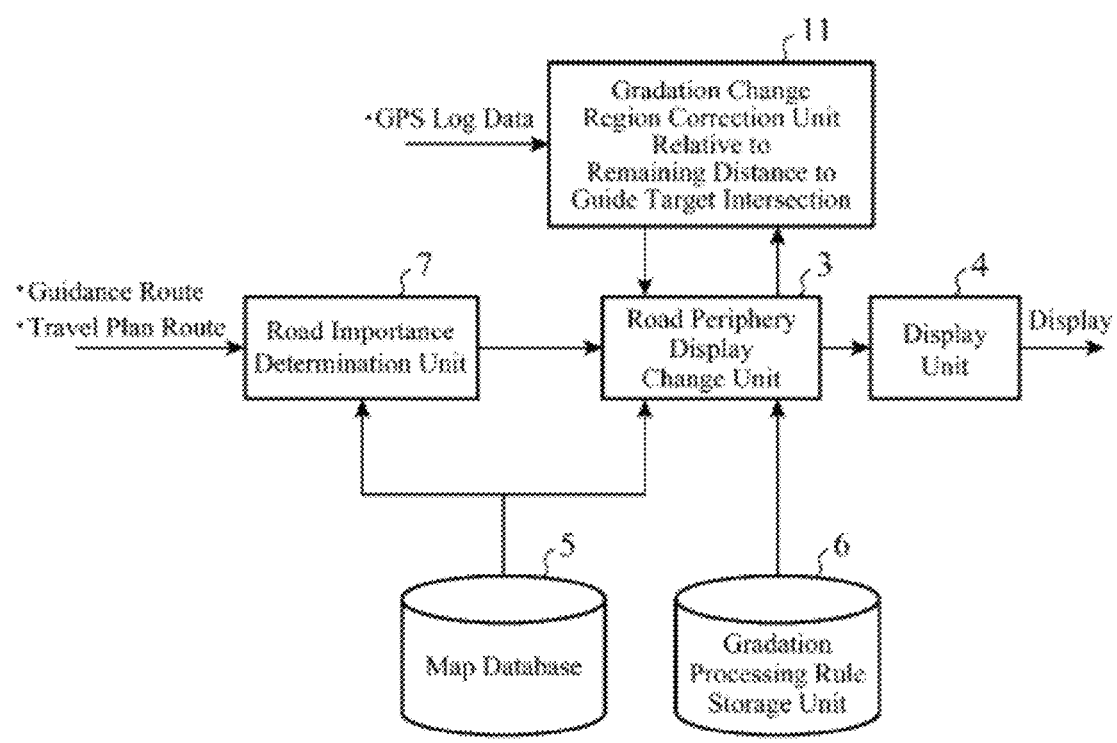
FIG. 21 is a block diagram showing a configuration of main parts of a navigation device according to Embodiment 5.

Embodiment 5 is a case of gradually changing a range of gradation change of secondary roads upon approaching a guidance intersection during traveling with route guidance. FIG. 21 is a block diagram showing a configuration of main parts of a navigation device according to Embodiment 5, and a gradation change range correction unit 11 that receives GPS log data and relative to a remaining distance to a guidance target intersection is provided therein. Since the remaining components are the same as those of Embodiment 2, the same reference numerals are denoted to the same parts, and redundant explanations thereof will be omitted. Note that an illustration of a guidance route search unit 1 and a travel plan route search unit 2 is omitted in FIG. 21.

Figure 22:
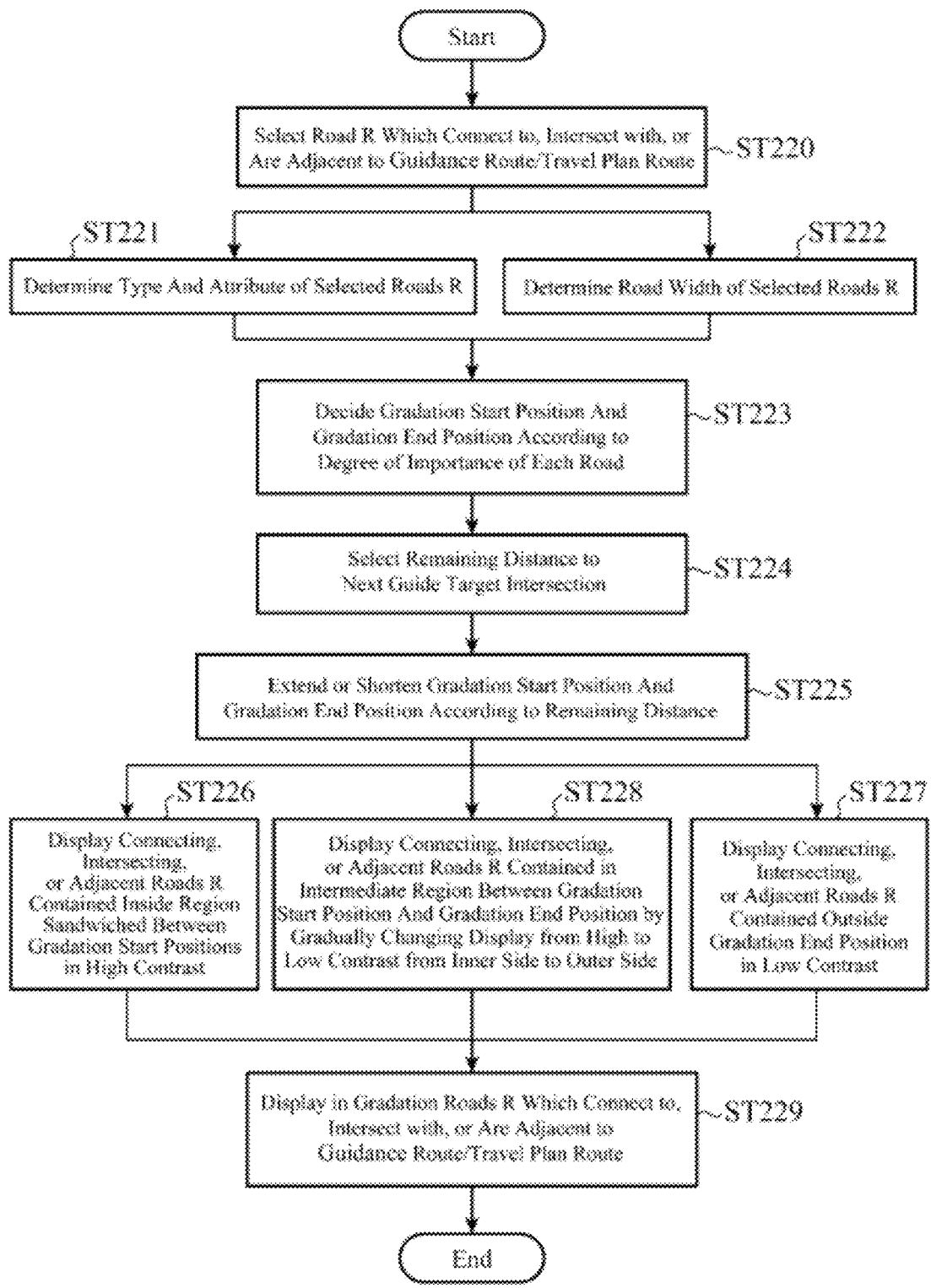
FIG. 22 is a flowchart explaining an operation of Embodiment 5.

Hereinafter, an operation of Embodiment 5 will be explained with reference to a flowchart shown in FIG. 22.

A road periphery display change unit 3 receives map information from a map database 5, and selects roads R which connect to, intersect with, or are adjacent to a guidance route/the travel plan route 21 (step ST220). Then, the type and attribute (expressway, public road, national road, prefectural road, minor street, and so on) of the selected roads R are determined (step ST221).

Moreover, the road width of the selected roads R is determined (step ST222). The actual road width for each road R is calculated by referring to the information regarding the number of lanes for each road R stored in the map database 5 and/or the most detailed map database. It is thereby possible to perform an easy-to-understand map drawing that is even closer to an actual road condition. Then, a gradation start position 26 and a gradation end position 27 are decided according to a degree of importance of each of the selected roads R (step ST223).

Subsequently, the gradation change range correction unit 11 selects the remaining distance to the next guidance target intersection based on the GPS log data (step ST224), and extends or shortens the distance between the gradation start position 26 and the gradation end position 27 of the roads R which connect to, intersect with, or are adjacent to the guidance route/the travel plan route 21 according to the selected remaining distance (step ST225).

Then, the connecting, interesting, and adjacent roads R contained inside the region sandwiched between the left and right gradation start positions 26 with the guidance route/the travel plan route 21 as a reference are displayed in a high contrast as shown in FIG. 10 (step ST226). Moreover, the connecting, intersecting or adjacent roads R contained outside the gradation end position 27 are displayed in a low contrast as shown in FIG. 11 (step ST227).

Further, the connecting, intersecting, or adjacent roads R contained in an intermediate region between the gradation start position 26 and the end position 27 are displayed in a gradation by gradually changing the display continuously or in multiple stages from high to low contrast from the inside toward the outside as shown in FIG. 12 (step ST228).

The display unit 4 receives a display signal from the road periphery display change unit 3 processed as mentioned above, and displays in a gradation the roads R which connect to, intersect with, or are adjacent to the guidance route/the travel plan route 21 (step ST229).

For example, the range of gradation change of the roads R which connect to, intersect with, or are adjacent to the guidance route is gradually extended as the remaining distance to the next guidance target intersection becomes shorter, in other words, as the vehicle approaches the guidance intersection. When the range of gradation change is extended, the road condition around the guidance intersection is displayed in a high contrast throughout the detailed parts, thereby facilitating the grasp of the peripheral road condition. Once the vehicle passes the guidance intersection, the range of gradation change is then gradually shortened, and returned to a normal range of gradation change after the passage of a given distance.

As described above, according to Embodiment 5, as the vehicle approaches the guidance intersection, the range of gradation change of the roads R which connect to, intersect with, or are adjacent to the guidance route is gradually extended, thereby facilitating the grasp of the peripheral road condition.

Embodiment 6

Figure 23:
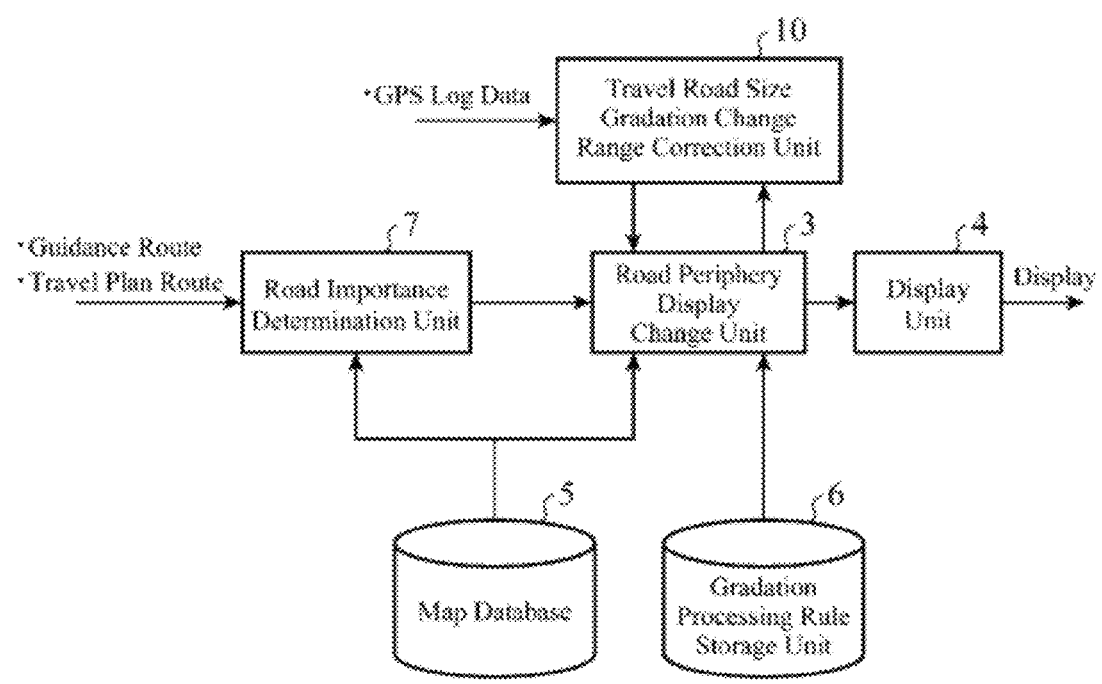
FIG. 23 is a block diagram showing a configuration of main parts of a navigation device according to Embodiment 6.

Embodiment 6 is a case of changing a range of gradation change of a connecting road according to the size (road type, the number of lanes, road width) of the road currently under travel. FIG. 23 is a block diagram showing a configuration of main parts of a navigation device according to Embodiment 6, and a travel road size gradation change range correction unit 10 that receives GPS log data is provided therein. Since the remaining components are the same as those of Embodiment 1, the same reference numerals are denoted to the same parts, and redundant explanations thereof will be omitted. Note that an illustration of a guidance route search unit 1 and a travel plan route search unit 2 is omitted in FIG. 23.

Figure 24:
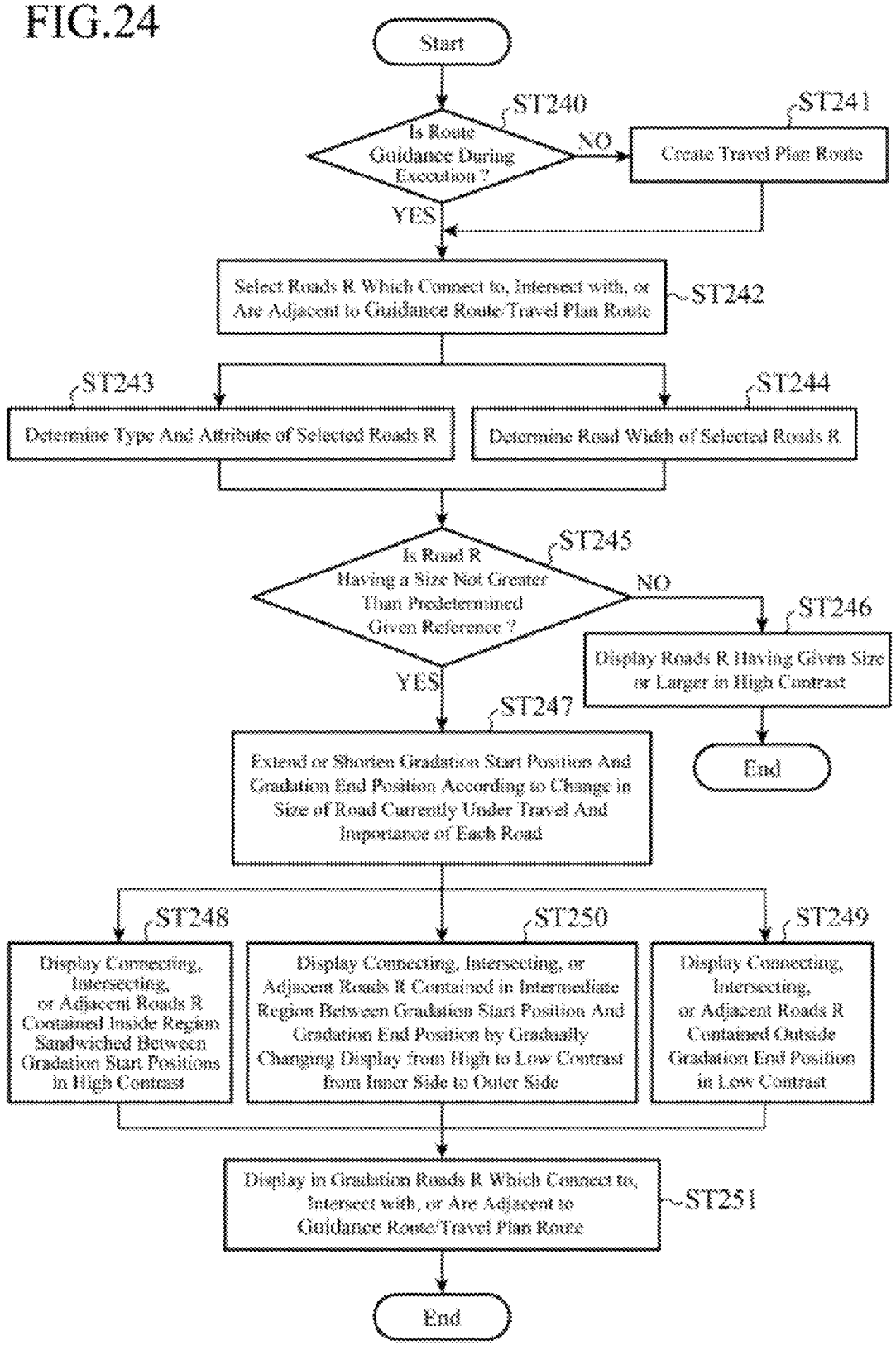
FIG. 24 is a flowchart explaining an operation of Embodiment 6.

Hereinafter, an operation of Embodiment 6 will be explained with reference to a flowchart shown in FIG. 24. First, it is determined whether a route guidance is during execution in the guidance route search unit 1 (step ST240); if the determination is NO, the travel plan route search unit 2 creates a travel plan route (step ST241). Subsequently, when the determination in step ST240 is YES and when the creation of the travel plan route in step ST241 is complete, a road periphery display change unit 3 performs processing operations of step ST242 to step ST250.

The road periphery display change unit 3 receives map information from the map database 5, and selects roads R which connect to, intersect with, or are adjacent to the guidance route/the travel plan route 21 (step ST242). Then, the type and attribute (expressway, public road, national road, prefectural road, minor street, and so on) of the selected roads R are determined (step ST243).

Moreover, the road width of the selected roads R is determined (step ST244). The actual road width for each road R is calculated by referring to the information regarding the number of lanes for each road R stored in the map database 5 and/or the most detailed map database. It is thereby possible to perform an easy-to-understand map drawing that is even closer to an actual road condition.

Subsequently, it is determined whether or not the selected roads R are a road R having a size that is not greater than a predetermined given reference, that is, a road R of a predetermined type (step ST245); if the determination is NO, the routine proceeds to step ST246 and displays the roads R having a given size or larger in a high contrast. When the determination in step ST245 is YES, the gradation start position 26 and the gradation end position 27 are decided according to the change in the size of the road currently under travel and the degree of importance of each of the roads R (step ST247).

Then, the connecting, interesting, and adjacent roads R contained inside the region sandwiched between the left and right gradation start positions 26 with the guidance route/the travel plan route 21 as a reference are displayed in a high contrast as shown in FIG. 10 (step ST248). Moreover, the connecting, intersecting or adjacent roads R contained outside the gradation end position 27 are displayed in a low contrast as shown in FIG. 11 (step ST249).

Further, the connecting, intersecting, or adjacent roads R contained in an intermediate region between the gradation start position 26 and the end position 27 are displayed in a gradation by gradually changing the display continuously or in multiple stages from high to low contrast from the inside toward the outside as shown in FIG. 12 (step ST250).

The display unit 4 receives a display signal from the road periphery display change unit 3 processed as mentioned above, and displays in a gradation the roads R which connect to, intersect with, or are adjacent to the guidance route/the travel plan route 21 (step ST251).

Case where, for instance, the vehicle leaves an expressway travel to go to a public road:

During the traveling on the expressway, when the vehicle approaches an interchange and a gradual reduction in the travel speed is detected, and it is thereby determined that the vehicle started traveling on an exit road, a length of gradation change is changed to be gradually longer in order to display more clearly the road information near the interchange. During the time required for the transition from the expressway to the public road, the map drawing pattern is continuously changed from an "expressway travel map drawing pattern" to a "public road travel map drawing pattern". This can be applied in both of during route guidance and during no route guidance.

Next, case where the vehicle enters from the public road to the expressway:

During the traveling on the public road, when it is determined that the vehicle enters the expressway via the on-ramp thereof, during the time required for the transition to merge into a main expressway, the map drawing pattern is continuously changed from a "public road travel map drawing pattern" to an "expressway travel map drawing pattern."

During the traveling on the public road, the range of gradation change of the secondary roads is defined with the size of the road and so on as a reference to make a display such that the contrast is gradually lowered toward the periphery; specifically, the length of gradation change is gradually shortened during the time required for the transition to merge into the main expressway, and as soon as the merging into the main expressway is complete, all the roads other than the main expressway are switched to a low-contrast display without gradation change.

As described above, according to Embodiment 6, the road R which is not smaller than a predetermined given size (or which is equal to or greater than the size of main highways, expressways, and the road currently under travel), that is, the road R of a predetermined type is not subjected to the gradation processing but displayed in a high contrast to the periphery of the screen, while the road R of a given size or smaller (one-way traffic, minor streets and the like), that is, the road R of another type, is gradually subjected to the gradation processing as the distance from the guidance route/the travel plan route 21 increases, and thereby the peripheral geographic conditions formed by the main roads are comprehensible. Moreover, since the minor streets are displayed in a low contrast, only the guidance route/the travel plan route 21 and the arterial road are discernable when the screen is viewed for a short period of time. Moreover, since changed is the gradation processing of the roads R which connect to, intersect with, or are adjacent to the travel road according to a change in size of the road currently under travel, the display of the roads R can be brought to be more recognizable as needed, thereby obtaining a navigation device in which the screen can be visually recognized more instantaneously.

Embodiment 7

Figure 25:
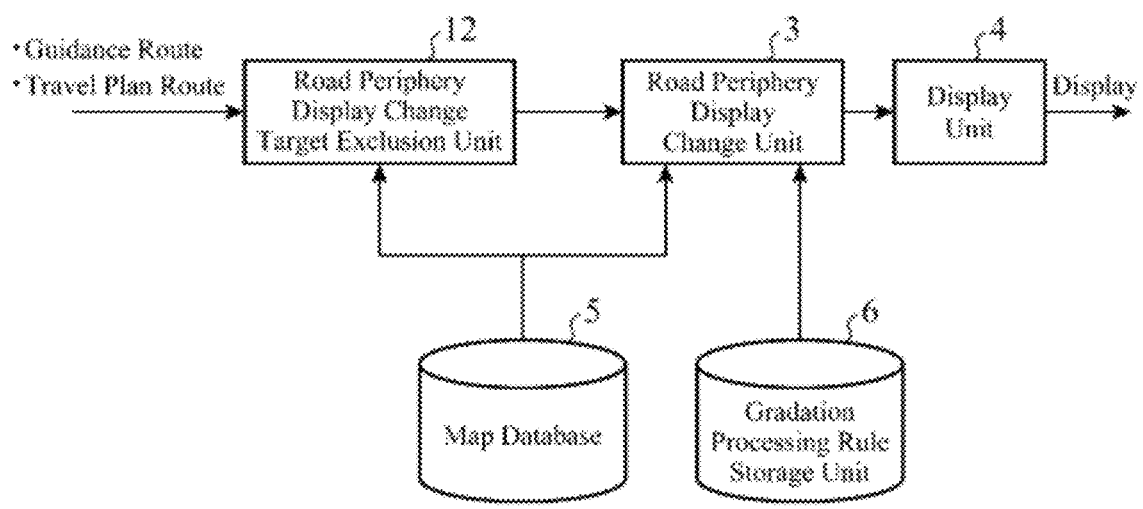
FIG. 25 is a block diagram showing a configuration of main parts of a navigation device according to Embodiment 7.

Embodiment 7 is a case of excluding no-entry roads. FIG. 25 is a block diagram showing a configuration of main parts of a navigation device according to Embodiment 7, and a road periphery display change target exclusion unit 12 is provided on the input side of a road periphery display change unit 3. Since the remaining components are the same as those of Embodiment 1, the same reference numerals are denoted to the same parts, and redundant explanations thereof will be omitted. Note that an illustration of a guidance route search unit 1 and a travel plan route search unit 2 is omitted in FIG. 25.

Figure 26:
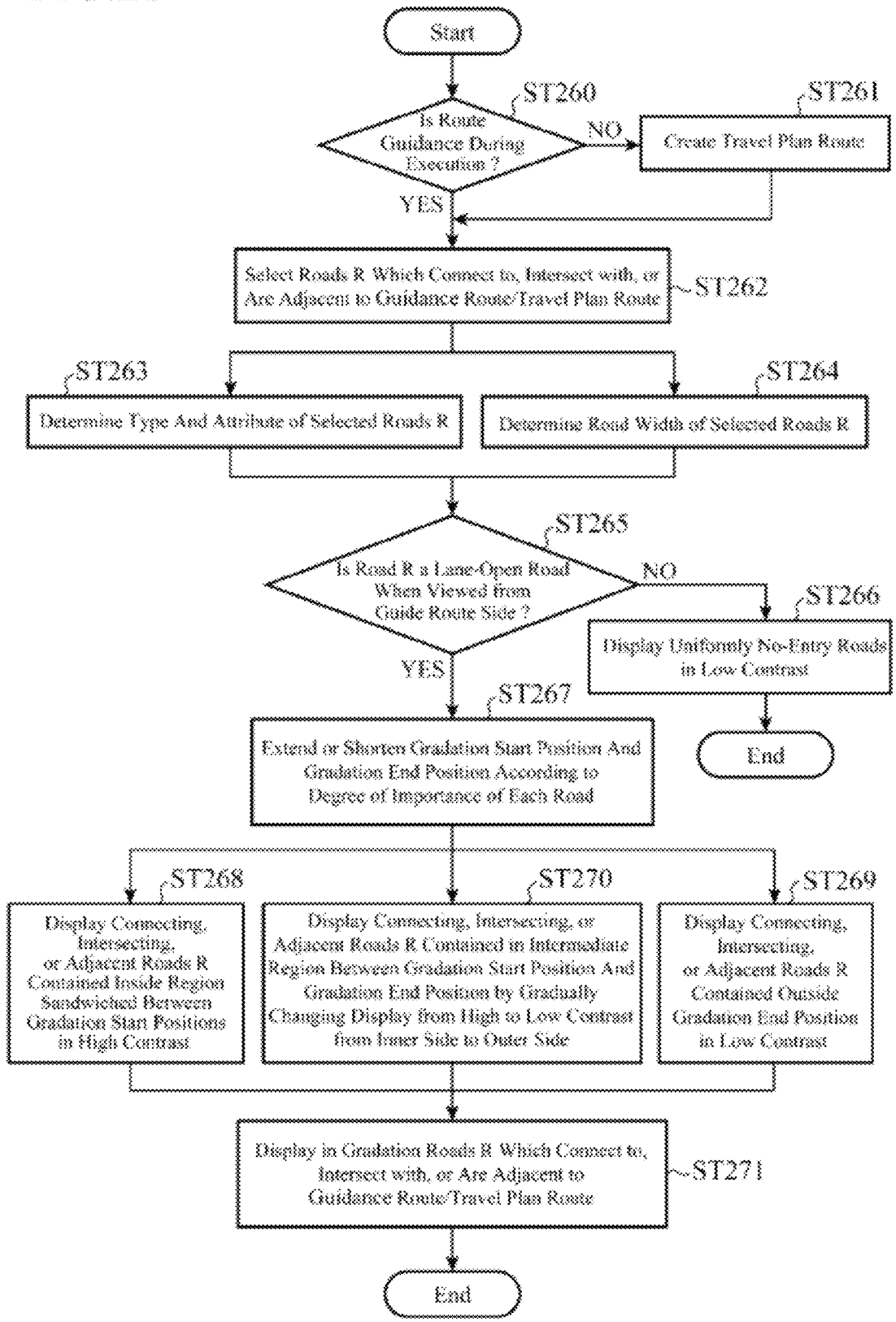
FIG. 26 is a flowchart explaining an operation of Embodiment 7.

Hereinafter, an operation of Embodiment 7 will be explained with reference to a flowchart shown in FIG. 26. First, it is determined whether a route guidance is during execution in the guidance route search unit 1 (step ST260); if the determination is NO, the travel plan route search unit 2 creates a travel plan route (step ST261). Subsequently, when the determination in step ST260 is YES and when the creation of the travel plan route in step ST261 is complete, the road periphery display change unit 3 performs processing operations of step ST262 to step ST270.

The road periphery display change unit 3 receives map information from the map database 5, and selects roads R which connect to, intersect with, or are adjacent to a guidance route/a travel plan route 21 (step ST262). Then, the type and attribute (expressway, public road, national road, prefectural road, minor street or the like) of the selected roads R are determined (step ST263).

Moreover, the road width of the selected roads R is determined (step ST264). The actual road width for each road R is calculated by referring to the information regarding the number of lanes for each road R stored in the map database 5 and/or the most detailed map database. It is thereby possible to perform an easy-to-understand map drawing that is even closer to an actual road condition.

Subsequently, when it is determined that the selected road R is a lane-open road when viewed from the guidance route side (step ST265), if the determination is NO, the routine proceeds to step ST266, and no-entry roads are uniformly subjected to a low-contrast display. When the determination in step ST265 is YES, the gradation start position 26 and the gradation end position 27 are decided according to the degree of importance of each of the roads R (step ST267).

Then, the connecting, interesting, and adjacent roads R contained inside the region sandwiched between the left and right gradation start positions 26 with the guidance route/the travel plan route 21 as a reference are displayed in a high contrast as shown in FIG. 10 (step ST268). Moreover, the connecting, intersecting or adjacent roads R contained outside the gradation end position 27 are displayed in a low contrast as shown in FIG. 11 (step ST269).

Further, the connecting, intersecting, or adjacent roads R contained in an intermediate region between the gradation start position 26 and the end position 27 are displayed in a gradation by gradually changing the display continuously or in multiple stages from high to low contrast from the inside toward the outside as shown in FIG. 12 (step ST270).

Figure 31:
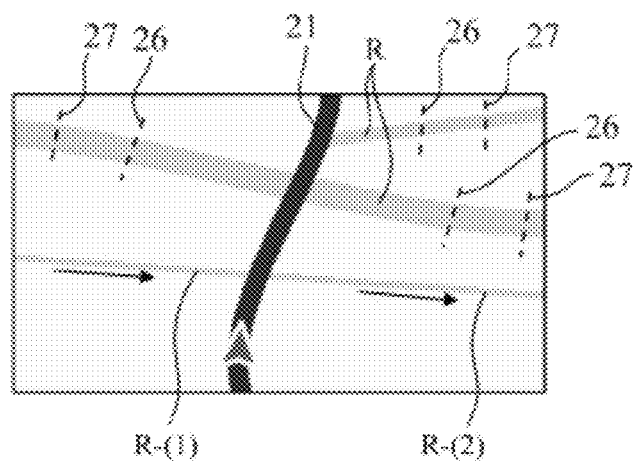
FIG. 31 is a process chart of a display based on the operation of Embodiment 7.
Figure 32:
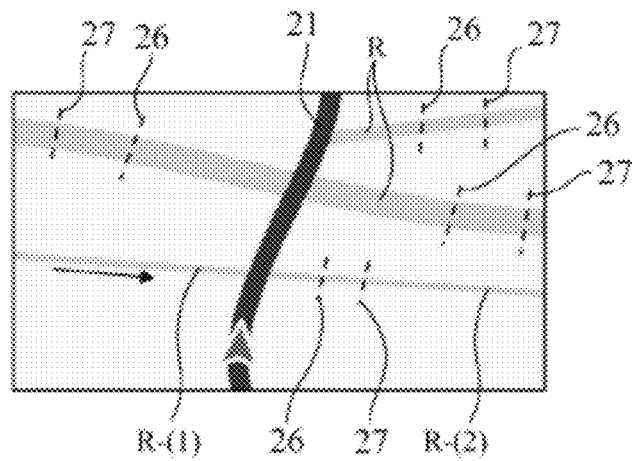
FIG. 32 is a process chart of the display based on the operation of Embodiment 7.
Figure 33:
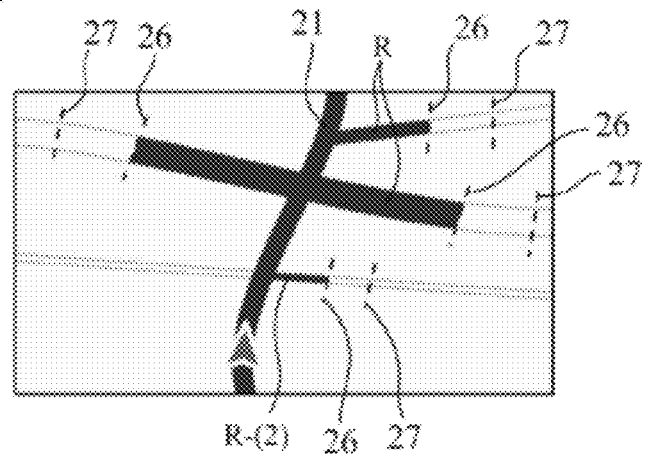
FIG. 33 is a process chart of the display based on the operation of Embodiment 7.
Figure 34:
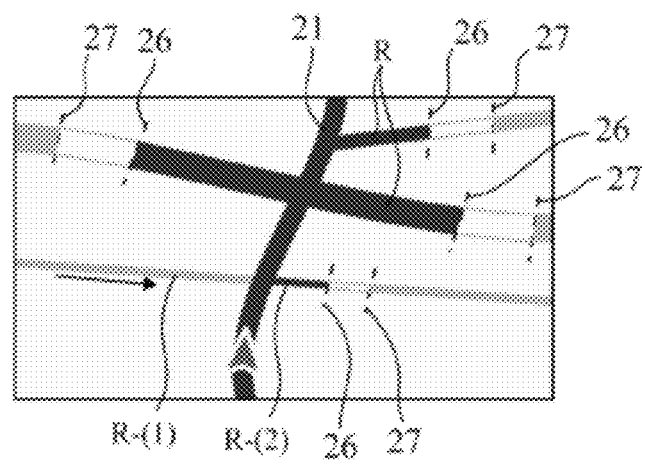
FIG. 34 is a process chart of the display based on the operation of Embodiment 7.
Figure 35:
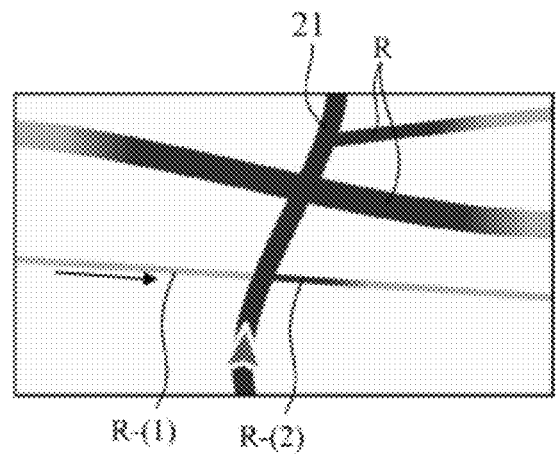
FIG. 35 is a process chart of the display based on the operation of Embodiment 7.

The display unit 4 receives a display signal from the road periphery display change unit 3 processed as mentioned above, and displays in a gradation the roads R which connect to, intersect with, or are adjacent to the guidance route/the travel plan route 21 (step ST271). For example, as shown in FIG. 31, when a road R-(1) that is a no-entry road from the guidance route/the travel plan route is detected, as shown in FIG. 32, the gradation region is set by excluding the road R-(1). Subsequently, as shown in FIG. 33, the roads R (including the lane-open road R-(2)) sandwiched between the left and right gradation start positions 26 are displayed in a high contrast, and, as shown in FIG. 34, the roads R contained outside the gradation end position 27 are displayed in a low contrast; consequently, the no-entry roads R-(1) are uniformly subjected to a low-contrast display as shown in FIG. 35, and only the lane-open roads are subjected to the gradation processing, which enables to intuitively determine whether a road is a no-entry road or a lane-open road.

As described above, according to Embodiment 7, the road R in which an entry from the guidance route side is not permitted due to one-way traffic is not subjected to the gradation processing, and is uniformly subjected to a low-contrast display regardless of the distance from the guidance route. In such a way, it becomes intuitively determinable whether a road is a lane-open road or a no-entry road, thereby achieving an even easier-to-understand map representation.

Embodiment 8

Figure 36:
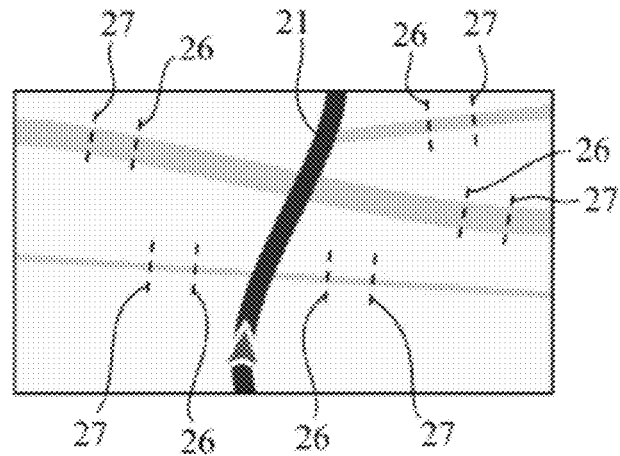
FIG. 36 is a process chart of another display based on the operation of Embodiment 8.
Figure 37:
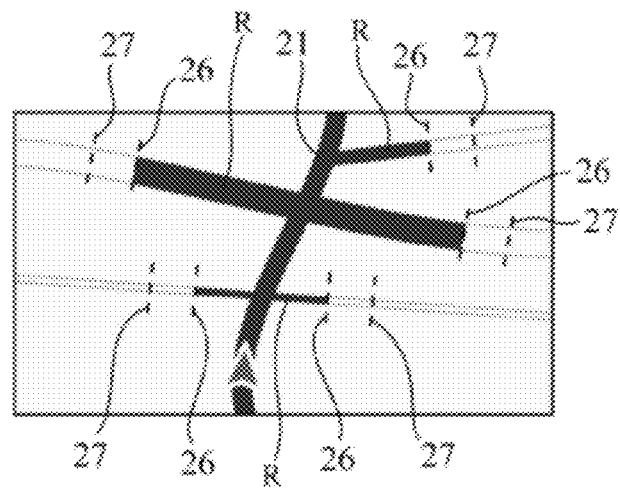
FIG. 37 is a process chart of another display based on the operation of Embodiment 8.
Figure 38:
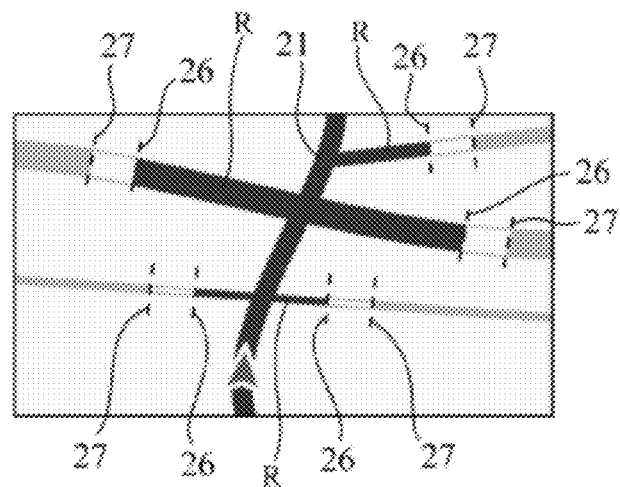
FIG. 38 is a process chart of another display based on the operation of Embodiment 8.
Figure 39:
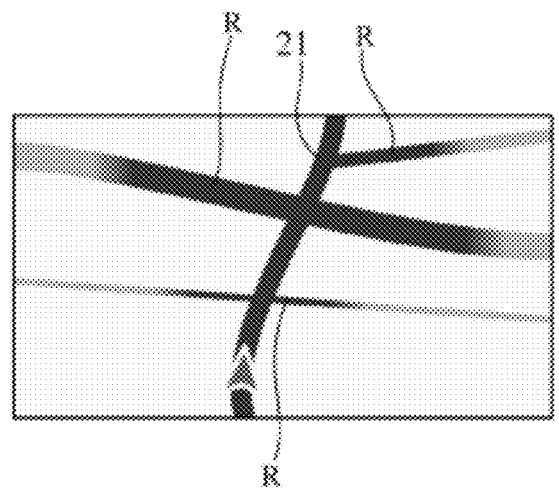
FIG. 39 is a process chart of another display based on the operation of Embodiment 8.
Figure 40:
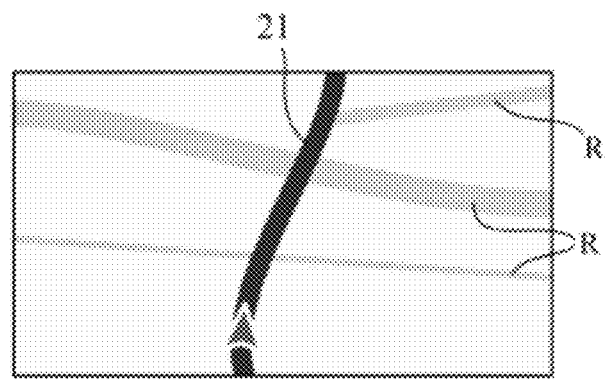
FIG. 40 is a conventional display mode chart.
Figure 41:
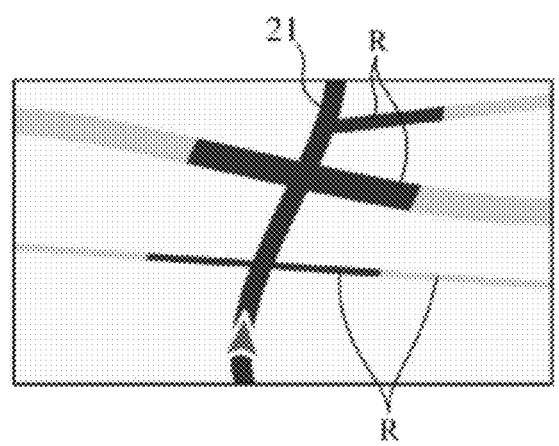
FIG. 41 is another conventional display mode chart.

In the foregoing Embodiments 2 to 6, examples of expanding or contracting a range of gradation change are explained, but a gradation start position and a gradation end position may be moved without changing the range of gradation change. Specifically, a range of changing a gradation may be moved. In the case that it is wished that connecting, intersecting or adjacent roads R are more conspicuous, e.g., in a case of a high degree of importance (road type, the number of lanes, road width) of the roads R, when a gradation start position 26 and a gradation end position 27 are moved by the same distance in the direction to be separated from a guidance route/a travel plan route 21 as shown in FIG. 36, the range of the roads R sandwiched between the left and right gradation start positions 26 displayed in a high contrast can be increased as shown in FIG. 37; also, when the roads R contained outside the gradation end position 27 are displayed in a low contrast as shown in FIG. 38, the region between the gradation start position 26 and the gradation end position 27 can be displayed in a gradation as shown in FIG. 39. Otherwise, instead of expanding the range of gradation change in the foregoing Embodiments 2 to 6, the gradation start position and the gradation end position may be moved in a direction of increasing the range to be displayed in a high contrast without changing the range of gradation change.

According to this embodiment, the similar effects to those of the foregoing Embodiments 2 to 6 can be obtained.

INDUSTRIAL APPLICABILITY

As described above, according to the navigation device of the present invention, since the driver can instantaneously visually recognize where the vehicle is currently traveling on the screen and how the subsequent road condition is changed even during operation, it is suitable for use in a navigation device or the like that displays roads which connect to, intersect with, or are adjacent to a guidance route/a travel plan route as a guidance route by changing display modes such as gradation position, gradation length and contrast.

EXPLANATION OF REFERENCE NUMERALS

1: guidance route search unit, 2: travel plan route search unit, 3: road periphery display change unit, 4: display unit, 5: map database, 6: gradation processing rule storage unit, 7: road importance determination unit, 8: relative to vehicle-speed gradation change range correction unit, 9: travel road size change detection unit, 10: travel road size gradation change range correction unit, 11: gradation change range correction unit relative to remaining distance to guidance target intersection, 12: road periphery display change target exclusion unit, 21: guidance route/travel plan route, 22 to 25: virtual lines, 26: gradation start position, 27: gradation end position, R: road.

The invention claimed is:

1. A navigation device, comprising:
a guidance route search unit configured to search for a guidance route from a current location to a destination; and
a road periphery display change unit configured to display a road which connects to, intersects with, or is adjacent to the guidance route, display the road in a high contrast on the inside of a first distance from the guidance route, display the road in a low contrast on the outside of a second distance that is longer than the first distance, and display the road by changing continuously or stepwise a gradation of contrast in an intermediate region between the inside and the outside, the gradation of the contrast being changed from the high contrast to the low contrast in a direction from the inside to the outside,
wherein the road periphery display change unit expands or contracts, on the displayed road, a length of the intermediate region according to a degree of importance of the displayed road.

2. The navigation device according to claim 1, wherein the degree of importance is determined according to a type and an attribution of the road, a width of the road, or the number of lanes.

3. The navigation device according to claim 1, wherein the road periphery display change unit is further configured to expand or contract the length of the intermediate region according to a travel speed of a vehicle on which the navigation device is mounted.

4. The navigation device according to claim 1, wherein the road periphery display change unit is further configured to expand or contract the length of the intermediate region according to a size of a travel road of a vehicle on which the navigation device is mounted.

5. The navigation device according to claim 1, wherein the road periphery display change unit is further configured to expand or contract the length of the intermediate region according to a type of a travel road of a vehicle on which the navigation device is mounted.

6. The navigation device according to claim 1, wherein the road periphery display change unit is further configured to expand or contract the length of the intermediate region according to a remaining distance to a guidance intersection with approaching to the guidance intersection during a travel with route guidance.

7. The navigation device according to claim 1, wherein the road periphery display change unit is further configured to set a road of a predetermined type, among the roads which connect to, intersect with or are adjacent to the guidance route, such that an area of the road outside the first distance from the guidance route has a same contrast as an area of the road inside the first distance from the guidance route.

8. The navigation device according to claim 1, wherein the road periphery display change unit is further configured to set a no-entry road, among the roads which connect to, intersect with or are adjacent to the guidance route, such that an area of the no-entry road inside the second distance from the guidance route has a same contrast as an area of the no-entry road outside the second distance from the guidance route.

9. A navigation device, comprising:
a guidance route search unit configured to search for a guidance route from a current location to a destination; and
a road periphery display change unit configured to display a road which connects to, intersects with, or is adjacent to the guidance route, display the road in a high contrast on the inside of a first distance from the guidance route, display the road in a low contrast on the outside of a second distance that is longer than the first distance, and display the road by changing continuously or stepwise a gradation of contrast in an intermediate region between the inside and the outside, the gradation of the contrast being changed from the high contrast to the low contrast in a direction from the inside to the outside,
wherein the road periphery display change unit moves, on the displayed road, a position of the intermediate region according to a degree of importance of the displayed road while keeping a length of the intermediate region.

10. The navigation device according to claim 9, wherein the road periphery display change unit is further configured to move the position of the intermediate region according to a travel speed of a vehicle on which the navigation device is mounted.

11. The navigation device according to claim 9, wherein the road periphery display change unit is further configured to move the position of the intermediate region according to a size of a travel road of a vehicle on which the navigation device is mounted.

12. The navigation device according to claim 9, wherein the road periphery display change unit is further configured to move the position of the intermediate region according to a remaining distance to a guidance intersection with approaching to the guidance intersection during a travel with route guidance.

13. The navigation device according to claim 1, further comprising:
a travel plan route search unit configured to search for a travel plan route when a route guidance based on the guidance route is not executed, the travel plan route being a road which extends in a traveling direction from the current location,
wherein the road periphery display change unit is further configured to display a road which connects to, intersects with, or is adjacent to the travel plan route in a high contrast on the inside of a first distance from the travel plan route, display the road in a low contrast on the outside of a second distance that is longer than the first distance, and display the road by changing continuously or stepwise a gradation of contrast in an intermediate region between the inside and the outside, the gradation of the contrast being changed from the high contrast to the low contrast in a direction from the inside to the outside.

14. A navigation device, comprising:
a guidance route search unit configured to search for a guidance route from a current location to a destination; and
a road periphery display change unit configured to display a road which connects to, intersects with, or is adjacent to the guidance route in a high contrast on the inside of a first distance from the guidance route, display the road in a low contrast on the outside of a second distance that is longer than the first distance, and display the road by changing continuously or stepwise a gradation of contrast in an intermediate region between the inside and the outside, the gradation of the contrast being changed from the high contrast to the low contrast in a direction from the inside to the outside,
wherein the road periphery display change unit carries out the display of the gradation according to a travel speed.

* * * * *